(12) United States Patent
Iwamura et al.

(10) Patent No.: US 8,422,793 B2
(45) Date of Patent: Apr. 16, 2013

(54) PATTERN RECOGNITION APPARATUS

(75) Inventors: Masakazu Iwamura, Osaka (JP); Koichi Kise, Osaka (JP)

(73) Assignee: Osaka Prefecture University Public Corporation, Osaka (JP)

( * ) Notice: Subject to any disclaimer, the term of this patent is extended or adjusted under 35 U.S.C. 154(b) by 133 days.

(21) Appl. No.: 13/148,850

(22) PCT Filed: Feb. 9, 2010

(86) PCT No.: PCT/JP2010/051889
§ 371 (c)(1),
(2), (4) Date: Aug. 10, 2011

(87) PCT Pub. No.: WO2010/092952
PCT Pub. Date: Aug. 19, 2010

(65) Prior Publication Data
US 2012/0230592 A1 Sep. 13, 2012

(30) Foreign Application Priority Data

Feb. 10, 2009 (JP) .................................. 2009-029031
Jul. 10, 2009 (JP) .................................. 2009-163924

(51) Int. Cl.
*G06K 9/50* (2006.01)
(52) U.S. Cl.
USPC ........................................................ 382/201
(58) Field of Classification Search .................. 382/181, 382/190, 197, 201, 203, 209, 218, 276, 305
See application file for complete search history.

(56) References Cited

U.S. PATENT DOCUMENTS 5,054,094 A 10/1991 Barski
6,539,106 B1 * 3/2003 Gallarda et al. .............. 382/149
(Continued)

FOREIGN PATENT DOCUMENTS

JP 4-507318 A 12/1992
JP 06-028476 A 2/1994
(Continued)

OTHER PUBLICATIONS

International Search Report for corresponding International Application No. PCT/JP2010/051889 mailed Mar. 9, 2010.
(Continued)

*Primary Examiner* — Daniel Mariam
(74) *Attorney, Agent, or Firm* — Renner, Otto, Boisselle & Sklar, LLP

(57) ABSTRACT

A pattern recognition apparatus including: an extracting section for extracting, from a query image that is composed of at least one piece of pattern component and previously undergoes a geometric transformation, the pattern component; a feature acquiring section for acquiring a geometric invariant feature of the pattern component as a query feature, the query feature being represented by at least three feature points including first, second and third feature points, each feature point locating on the pattern component and being retrieved from the pattern component based on a predetermined rule; a comparing section for comparing the query feature with a plurality of reference features, each reference feature representing different reference patterns prepared as candidates for pattern recognition; and a pattern determination section for determining, as a recognition result, a specific reference pattern out of the candidates based on a similarity of features therebetween and, wherein: each reference feature is represented using feature points retrieved from each reference pattern based on the same rule as that of the query feature, and based on the predetermined rule, a position of the first feature point is specified out of points which locate on the pattern component and are invariant to the geometric transformation, a position of the second feature point is specified using a characteristic regarding a shape of the pattern component, the characteristic being invariant to the geometric transformation, and a position of the third feature point is specified from a predetermined value being invariant to the geometric transformation and from the specified positions of the first and second feature points.

10 Claims, 42 Drawing Sheets

(a) Original figure  (b) Normalization by invariant coordinate system  (c) Histogram representing figure

U.S. PATENT DOCUMENTS

| | | | |
|---|---|---|---|
| 7,734,067 B2 * | 6/2010 | Kim et al. | 382/115 |
| 2003/0128876 A1 | 7/2003 | Yamaguchi | |
| 2005/0053282 A1 | 3/2005 | Suen et al. | |
| 2008/0177764 A1 | 7/2008 | Kise et al. | |
| 2008/0240492 A1 | 10/2008 | Ohira et al. | |
| 2011/0164826 A1 | 7/2011 | Noguchi et al. | |

FOREIGN PATENT DOCUMENTS

| | | | |
|---|---|---|---|
| JP | 2003-242509 A | 8/2003 | |
| JP | 2005-084765 A | 3/2005 | |
| JP | 2008-252856 A | 10/2008 | |
| JP | 2008-269582 A | 11/2008 | |
| WO | 2006/092957 A1 | 9/2006 | |

OTHER PUBLICATIONS

Watanabe et al., "Translation Camera", Proc. ICPR 1998, pp. 613-617, 1998.

Fujisawa et al., "Information Capturing Camera and Developmental Issues", Proc. ICDAR 1999, pp. 205-208, Sep. 1999.

Chen et al., "Automatic Detection and Recognition of Signs from Natural Scenes", IEEE Trans. Image Processing, vol. 13, No. 1, pp. 87-99, Jan. 2004.

Myers et al., "Rectification and recognition of text in 3-D scenes", IJDAR, vol. 7, No. 2-3, pp. 147-158, 2004.

Kusachi et al., "Kanji Recognition in Scene Images without Detection of Text Fields-Robust Against Variation of Viewpoint, Contrast, and Background Texture", Proc. ICPR2004, 2004.

Li et al., "Character Recognition under Severe Perspective Distortion", Proc. ICPR2008, 2008.

Noguchi et al., "Experimental Evaluation of Balancing the Recognition Rate, Processing Time and Memory Requirement for Large-Scale Recognition of Specific Objects", IEICE trans. D., vol. J92-D, pp. 1135-1143, Aug. 2009.

* cited by examiner

Fig.2
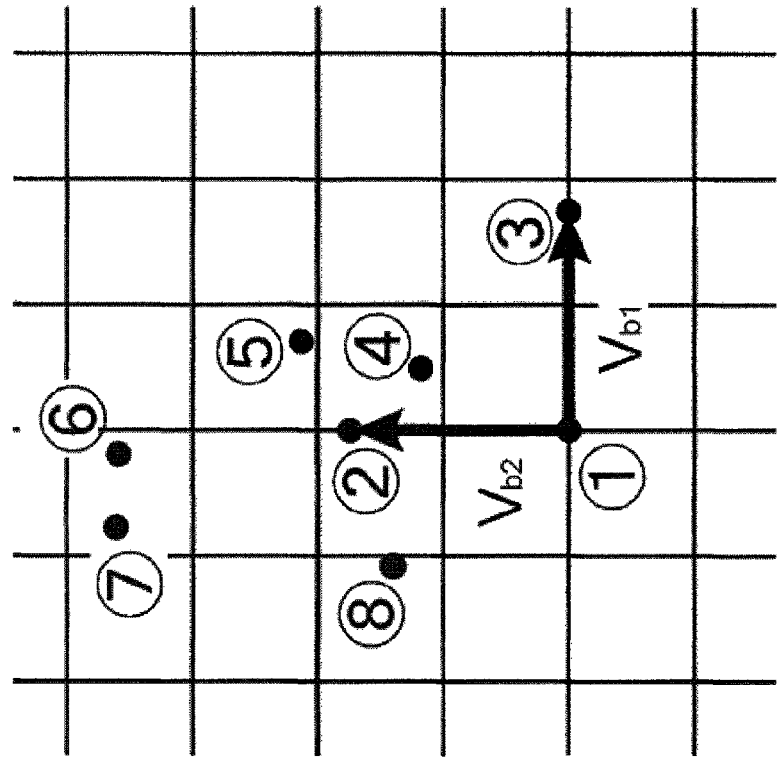
(b) Projection to an invariant coordinate system
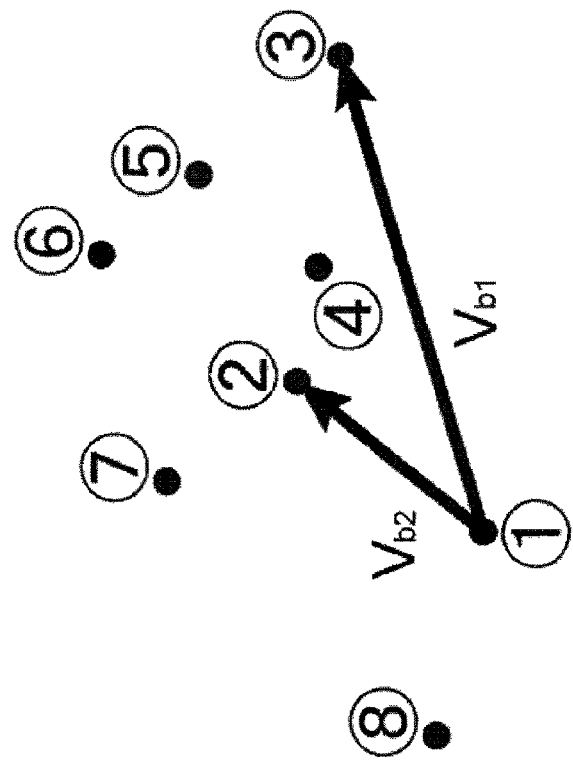
(a) Determination of bases (a) Description of connected component  (b) Separated character table (b) 10 Pictograms used in experiments (a) Fonts used in experiments
Arial, Century, Gigi, and Impact
from the top Fig.22
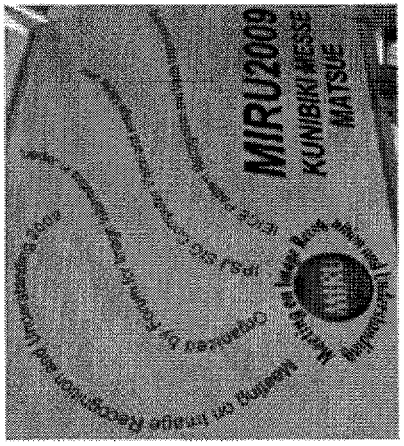
(c) 45 degrees
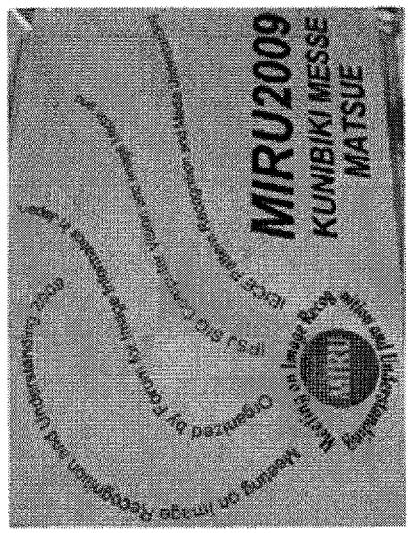
(b) 30 degrees
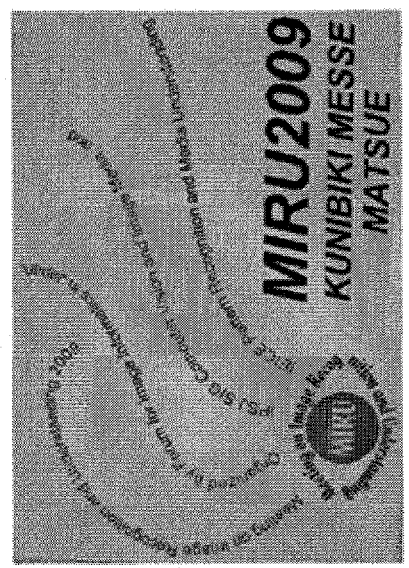
(a) 0 degree Fig. 24
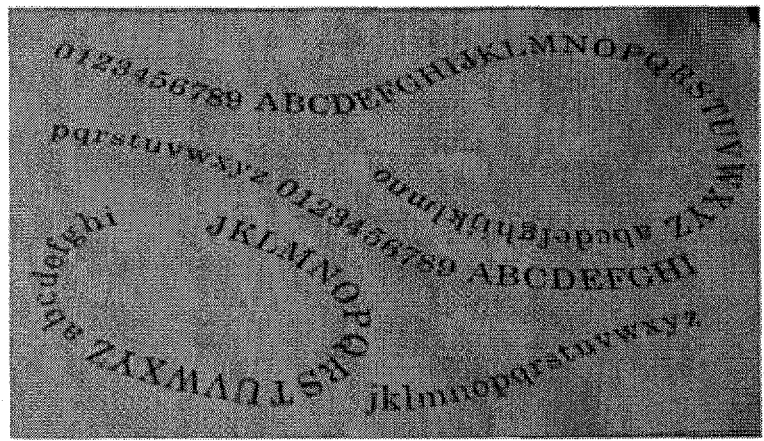
(c) 45 degrees
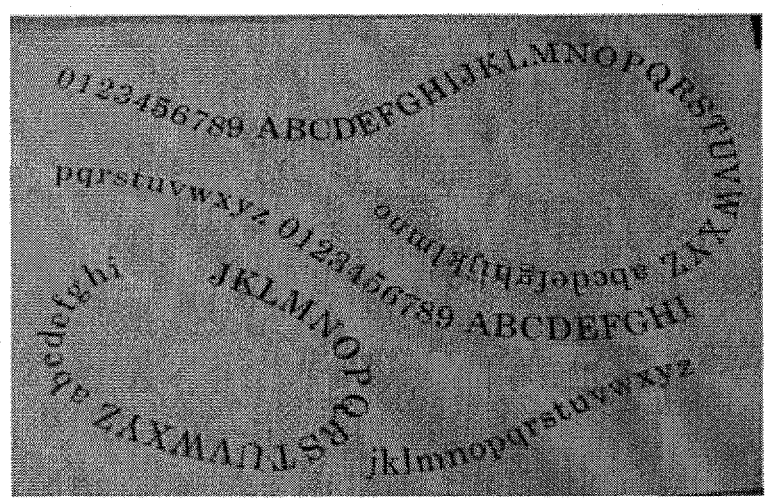
(b) 30 degrees
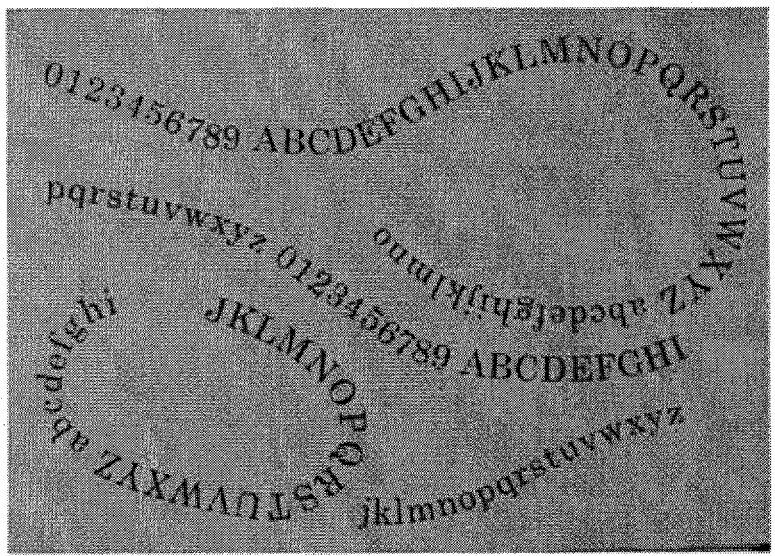
(a) 0 degree

Fig.25

| Font | Sample |
|---|---|
| Arial | 0123ABCDabcd |
| Century | 0123ABCDabcd |
| Times New Roman | 0123ABCDabcd |
| Verdana | 0123ABCDabcd |
| Meiryo bold | 0123ABCDabcd |
| OCRB | 0123ABCDabcd |
| Book Antiqua Bold | 0123ABCDabcd |
| BellGothicStd-Black | 0123ABCDabcd |
| Franklin Gothic Medium | 0123ABCDabcd |
| TektonPro-Bold | 0123ABCDabcd |

(a) When a word is read from character number ①

(b) When a word is read from character number ⑤

(a) Failure in acquiring word region  (b) Combined to adjacent character

PATTERN RECOGNITION APPARATUS

TECHNICAL FIELD

The present invention relates to a pattern recognition apparatus, and more particularly to an apparatus that can realize a real-time recognition of camera-captured characters or pictograms.

BACKGROUND

Camera-based pattern recognition has received considerable attention due to a wide variety of possible applications. One of convincing applications is a "translation camera" which is a translating device integrated with a camera and a character recognition apparatus (see Non-Patent Documents 1 and 2). Another possible one is to recognize characters captured by a camera and to convert the recognized characters into a voice so as to tell them to visually impaired people. It is also considered that all patterns captured by a camera are recognized, and among the patterns, only information that has already been registered beforehand and that is required by a user is given to the user. This application is useful to a visually impaired person. There are persons who have a difficulty in finding characters in visually impaired persons. Therefore, the application that can be said to be "machine vision" is extremely useful.

In order to achieve the applications above, a practical camera-based character recognition technique which is (1) ready for real-time processing, (2) robust to geometric distortion, and (3) free from layout constraints, is required.

Firstly, the real-time processing is indispensable in order not to deteriorate the convenience of the user. As for the geometric distortions, a known technique has been realized (for example, see Non-Patent Documents 3 and 4), when the subject is limited to a character. Particularly, it has been reported that the technique in the Non-Patent Document 4 operates in real-time. In these techniques, text lines are extracted from an image captured with the use of a camera, an affine distortion, which is an approximation of projective distortion having the highest degree of freedom in distortion, is corrected, and finally, the extracted character is recognized. However, in the technique in the Non-Patent Document 4, for example, the projective distortion is corrected on a text-line basis, so that a character that does not form the text line cannot be recognized. This technique does not cope with a rotating character. Therefore, the subject illustrated in FIG. 1 cannot be recognized, which means the technique does not satisfy the requirement (3). Specifically, the technique does not satisfy the requirement of being capable of recognizing patterns of various layouts described above.

On the other hand, as a technique of satisfying the requirements (2) and (3) described above, Kusachi et al or Li et al has proposed a technique of recognizing characters one by one (for example, see Non-Patent Documents 5 and 6). However, since the technique described in the Non-Patent Documents 5 and 6 recognizes characters one by one, the problem involved with the text line is not caused, but it takes much time for the processing, resulting in that this technique cannot be said to realize the real-time processing in the requirement (1). A technique satisfying requirements (1) to (3) simultaneously has been desired.

CITATION LIST

Non-Patent Document

Non-Patent Document 1: Y. Watanabe, Y. Okada, Y.-B. Kim and T. Takeda, "Translation camera," Proc. ICPR 1998, pp. 613-617, 1998.

Non-Patent Document 2: H. Fujisawa, H. Sako, Y. Okada and S.-W. Lee, "Information capturing camera and developmental issues," proc. ICDAR1999, pp. 205-208, September 1999.

Non-Patent Document 3: X. Chen, J. Yang and A. Waibel, "Automatic detection and recognition of signs from natural scenes," IEEE Trans. Image Processing, vol. 13, no. 1, pp. 87-99, January 2004.

Non-Patent Document 4: G. K. Myers, R. C. Bolles, Q.-T. Luong, J. A. Herson and H. B. Aradhye, "Rectification and recognition of text in 3-d scene," IJDAR, vol. 7, no. 2-3, pp. 147-158, 2004.

Non-Patent Document 5: Y. Kusachi, A. Suzuki, N. Ito and K. Arakawa, "Kanji recognition in scene images without detection of text fields—robust against variation of viewpoint, contrast, and background texture—," Proc. ICPR 2004, 2004.

Non-Patent Document 6: L. Li and C. L. Tan, "Character recognition under severe perspective distortion," Proc. ICPR 2008, 2008.

Non-Patent Document 7: Kazuto Noguchi, Koichi Kise, and Masakazu Iwamura, "Experimental evaluation of balancing the recognition rate, processing time, and memory requirement for large-scale recognition of specific objects", IEICE trans. D, vol. J92-D, pp. 1135-1143, August 2009.

SUMMARY OF INVENTION

Technical Problem

In view of the above circumstance, the present invention provides a pattern recognition apparatus based upon a simple but efficient technique that can realize real-time recognition of a pattern such as characters and pictograms in order to realize a pattern recognition technique satisfying the above-mentioned requirements.

Solution to Problem

The present invention provides a pattern recognition apparatus including: an extracting section for extracting, from a query image that is composed of at least one piece of pattern component and previously undergoes a geometric transformation, the pattern component; a feature acquiring section for acquiring a geometric invariant feature of the pattern component as a query feature, the query feature being represented by at least three feature points including first, second and third feature points, each feature point locating on the pattern component and being retrieved from the pattern component based on a predetermined rule; a comparing section for comparing the query feature with a plurality of reference features, each reference feature representing different reference patterns prepared as candidates for pattern recognition; and a pattern determination section for determining, as a recognition result, a specific reference pattern out of the candidates based on a similarity of features therebetween and, wherein: each reference feature is represented using feature points retrieved from each reference pattern based on the same rule as that of the query feature, and based on the predetermined rule, a position of the first feature point is specified out of points which locate on the pattern component and are invariant to the geometric transformation, a position of the second feature point is specified using a characteristic regarding a shape of the pattern component, the characteristic being invariant to the geometric transformation, and a position of the third feature point is specified from a predetermined value being invariant to the geometric transformation and from the specified positions of the first and second feature points.

EFFECT OF THE INVENTION

In the pattern recognition apparatus according to the present invention, a position of the first feature point is specified out of points which locate on the pattern component and are invariant to the geometric transformation, a position of the second feature point is specified using a characteristic regarding a shape of the pattern component, the characteristic being invariant to the geometric transformation, and a position of the third feature point is specified from a predetermined value being invariant to the geometric transformation and from the specified positions of the first and second feature points. Therefore, the number of set of the invariant coordinate systems is limited to the number of combinations in which one of pixels satisfying the predetermined standard is determined to be the first feature point. Therefore, the method according to the present invention can remarkably reduce a processing time, compared to a known geometric hashing method. Specifically, according to the present invention, when the first feature point is determined, the second and third feature points corresponding to the first feature point are uniquely determined. The known geometric hashing needs $_pP_n$ processes involved with the invariant coordinate systems, $_pP_n$ processes being permutation for selecting n, which is the predetermined number, feature points from p feature points, which are all feature points consisting the pattern region, while the present invention only performs $_pP_1$ processes involved with the invariant coordinate system for selecting the first point. Accordingly, the real-time recognition of the pattern can be realized from the image acquired with the geometric transformation. Which one of the first and second feature points is determined first is optional.

In the present invention, the query image is an image containing a pattern to be recognized. The pattern includes one or more, and a block of connected components. A block of connected components means the components in which the patterns to be recognized are regionally connected to form a block. For example, a character such as "I" or "J" is one example of a recognition target including one regionally connected component. On the other hand, there is a separated character, or a separated pattern, which is one character including plural connected components, such as "i" or "j".

In the present invention, it is a premise that the query image is acquired after suffering from the geometric transformation. For example, when a character serving as the recognition target is read by an image scanner, it is read with the geometric distortion such as scaling or rotation. In this case, the query image suffers from a distortion due to a similar transformation. When an image containing characters to be recognized is captured by a camera, the resultant image suffers from a projective distortion due to the deviation from a right position. If the deviation amount is small, the image can be approximated, wherein the distortion is regarded as an affine distortion not accompanied by a scaling change in a depth direction.

The image feature of each pattern is stored in an image database as being associated with a vector indicating the feature. Examples of the image feature include a feature in a shape, a feature in a density distribution, a chromatic feature, and a combination thereof. Each vector in the image database is preliminarily registered as being systematized with the use of a hash table in order to enable a fast vector comparison.

The functions of the extracting section, the feature acquiring section, and the comparing section may be realized through an execution of a predetermined program by a computer. Alternatively, all or some processes of the functions may be realized by a hardware mounted on a semiconductor chip, for example. In a later-described embodiment, the functions of the respective sections are realized by hardware and software of a personal computer.

An adaptive binarization and contour extraction are used for extracting the pattern in the present invention. The geometric hashing is used to the pattern recognition in the present invention as being improved. The computational cost in the geometric hashing considering the affine transformation is $O(P^4)$ where P is the number of feature points. On the other hand, the computational cost can be reduced to $O(P^2)$ in the present invention by utilizing the calculation principle of an invariant. With help of a method utilizing a voting system, the present invention runs well in real-time even on a laptop personal computer with a web camera.

BRIEF DESCRIPTION OF THE DRAWINGS

FIG. 2 is a first explanatory view illustrating a method of determining an invariant coordinate system in a known geometric hashing.

FIG. 22 is an explanatory view illustrating images in FIG. 21 captured with an angle of 0 degree, 30 degrees, and 45 degrees, respectively, from a paper.

FIG. 24 is an explanatory view illustrating an image used as a recognition target in an experimental example 3 according to the present invention.

FIG. 25 is an explanatory view illustrating some of 100 fonts used for the recognition in the experimental example 3, and 10 fonts used for the recognition in an experimental example 4 according to the present invention.

PREFERRED EMBODIMENTS OF THE INVENTION

Figure 1:
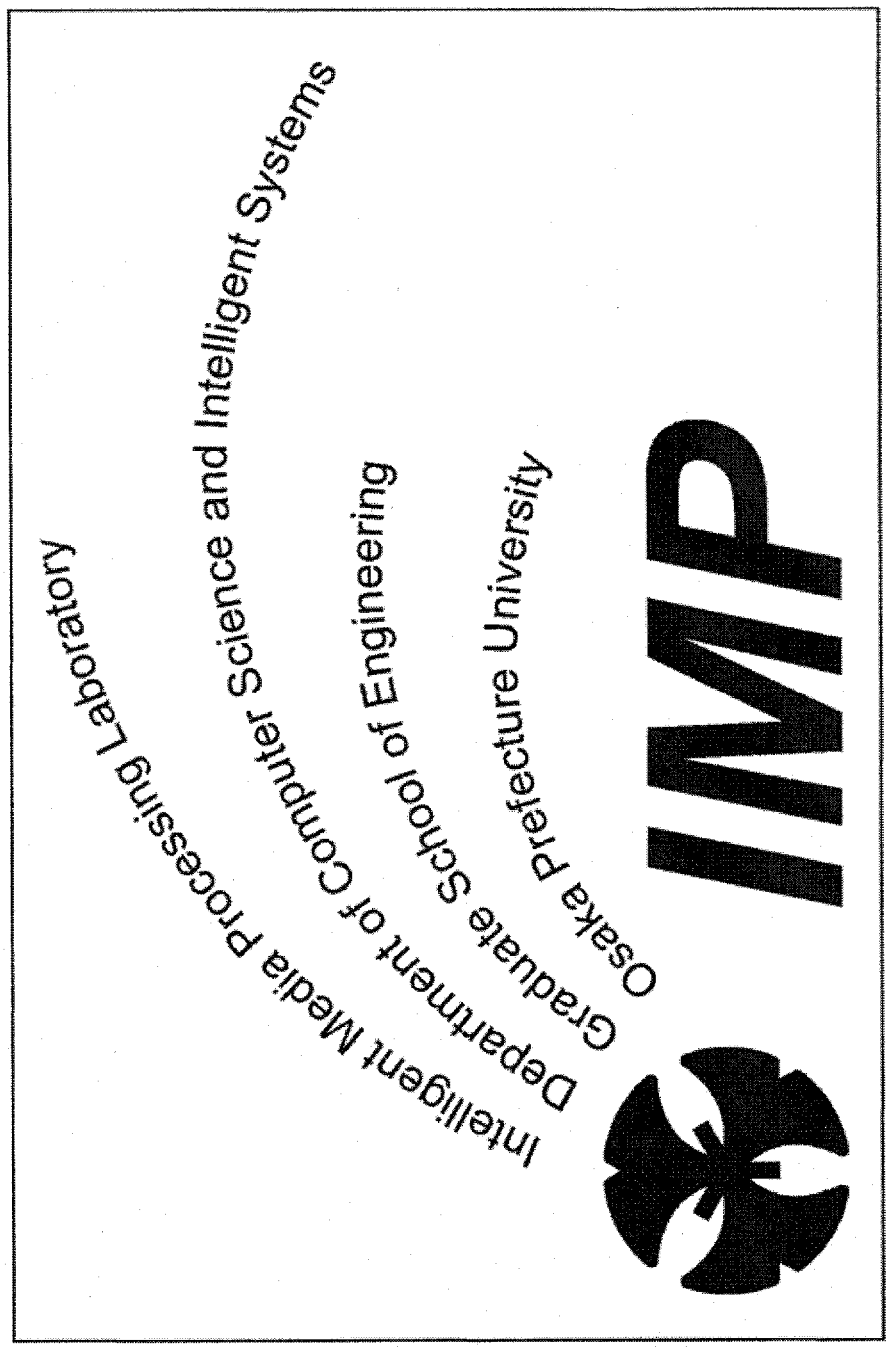
FIG. 1 is an explanatory view illustrating one example of an image that is a recognition target according to the present invention.

Expressing the present invention, which solves the foregoing problem, in different ways, the present invention relates to a pattern recognition apparatus including: an extraction processing section (the extracting section) for extracting, from a query image that is acquired in such a manner that one or more patterns previously undergo a geometric transformation, a block of connected components (the pattern component) from plural pixels constituting the pattern as a pattern region; a feature vector generating section (the feature acquiring section) for generating a feature vector, which represents an image feature of the pattern region, as a query feature vector, from an invariant coordinate system that is spanned by two linearly independent vectors, each vector connecting two of the acquired three feature points, and that is invariant to the geometric transformation, with respect to each combination in which three or more feature points are determined from one pattern region based upon a predetermined rule; an index calculating section for calculating an index value by applying a predetermined hash function to the generated query feature vector; a comparing section for referring, with the use of the index, a hash table in which a reference feature vector indicating a feature of a shape of each reference pattern is associated with the corresponding reference pattern and preliminarily stored as being classified into plural bins, for plural reference patterns as candidates of a recognition result, in order to compare the query feature vector whose index is calculated with one or more reference feature vectors stored in the bin of the reference destination; and a pattern determining section for determining the reference pattern that should be specified as the recognition result based upon the comparison, wherein: the reference feature vector is generated with respect to each combination for selecting three points out of the feature points determined through the procedure same as the procedure of the query feature vector, the feature vector generating section determines, based upon the rule applied to the determination of the feature points, one of the pixels satisfying the predetermined standard out of the pixels involved with the pattern region as the first feature point, determines one point that is determined using a characteristic regarding a shape of the pattern region as the second feature point, the characteristic being invariant to the geometric transformation, and determines one point, which is determined based upon a predetermined value being invariant to the geometric transformation and the first and second feature points, as a third feature point.

In the pattern recognition apparatus described above, based upon the rule applied to the determination of the feature points, the feature vector generating section determines one of the pixels satisfying the predetermined standard out of the pixels involved with the pattern region as the first feature point, determines one point that is determined using a characteristic regarding a shape of the pattern region as the second feature point, the characteristic being invariant to the geometric transformation, and determines one point, which is determined based upon a predetermined value being invariant to the geometric transformation and the first and second feature points, as a third feature point. Therefore, the number of a set of the invariant coordinate systems is limited to the number of the combinations in which one of the pixels satisfying the predetermined standard is determined as the first feature point. Accordingly, a processing time can dramatically be reduced, compared to the known geometric hashing method.

Preferable embodiments of the present invention will be described below.

The position of the first feature point may be specified out of pixels locating on a contour of the pattern component. With this, the contour of the pattern region is extracted, and the first feature point can surely be determined as one point on the contour.

The characteristic may be characterized in that a center of gravity is invariant to affine transformation as a kind of the geometric transformation, and the position of the second feature point may be specified as a center of gravity of the pattern components, using the characteristic. The center of gravity is an invariant to the affine transformation. With this, the second feature point can uniquely be determined as the center of gravity of the target pattern region.

The characteristic may be characterized in that an area ratio is invariant to affine transformation as a kind of the geometric transformation, and the position of the third feature point may be specified from a contour of the pattern component and based on a predetermined value of an area ratio of the area of the pattern components to the area of a triangle defined by apexes corresponding to the first, second and third feature points, using the characteristic. The area ratio is an invariant to the affine transformation. With this, the third feature point can uniquely be determined from the predetermined invariant, and the first and second feature points.

The feature acquiring section may acquire the geometric invariant feature using a geometric invariant coordinate system that is spanned by two linearly independent vectors, each vector connecting two of the acquired three feature points.

The comparing section may make comparisons of the query feature with the reference features that are related to the corresponding reference patterns and stored in a hash table, wherein the hash table may have a plurality of bins; each reference feature may preliminarily be classified and stored in one of the bins determined through a calculation of a predetermined hash function from the reference feature; and the comparing section may refer an appropriate bin for each comparison using an index that is obtained through a calculation of the hash function from the acquired query feature. With this, the reference feature vector corresponding to the query feature vector can be compared with the use of the hash table, so that the comparison between the query feature vectors and the reference feature vector can be made in a short period.

The pattern determining section may estimate a pose of the pattern region based upon a correspondence relationship between the coordinate of the feature point determined by the feature vector generating section for the pattern region of the query image and the coordinate of the feature point stored in the hash table, so as to estimate a pose of the query image by performing a majority rule on the respective estimations. With this, the pose of the acquired query image is estimated based upon the correspondence relationship of the coordinates of the feature points, whereby the geometric distortion of the query image can be corrected, and the matching can be made with higher precision than in the case where the correction is not made.

The pattern determining section may have a discrete pattern table storing at least one group of discrete patterns, each discrete pattern corresponding to one of the reference patterns and the group of discrete patterns providing one recognition result; may refer the discrete pattern table to decide whether a correspondence between the determined specific reference pattern out of the candidates and one of the discrete patterns of the group exists or not; and may determine a recognition result as that being provided by the group of which the corresponding discrete pattern to the determined specific reference pattern belongs to the group when the correspondence exists and a correspondence of every other discrete pattern of the group previously exists. With this, the recognition result can be determined for the discrete pattern.

The discrete pattern table may store a relative position of one discrete pattern to another discrete pattern in the group, and the pattern determination section may determine a recognition result when another determined specific reference pattern locates at a position specified by the stored relative position of the discrete pattern corresponding to one determined specific reference pattern. With this, the recognition result can be determined with higher precision, considering the positional relationship between the discrete pattern and another pattern involved with its combination.

In the pattern recognition apparatus, the query image may include a word pattern composed of plural characters, and the pattern recognition apparatus may further include: a word candidate determining section for obtaining the shortest route in which each character recognized by the pattern determining section is traced once, and for determining an order and reverse order of the obtained route as candidates of the word; a rotation angle determining section for obtaining a rotation angle of each character in a predetermined direction of the query image; and a reading-order determining section in which a difference in the rotation angle between two characters adjacent to each other along the order or inverse order of the route is specified as a first evaluation index, the rotation angle that the first character should take is estimated based upon the direction toward a second character, which is adjacent to a first character that is defined to be either one end of each candidate, and a predetermined rule involved with a reading direction, and the difference between the estimated rotation angle and the rotation angle of the first character determined by the rotation angle determining section is specified as a second evaluation index, wherein the candidate that minimizes the first and second evaluation indexes is selected in order to determine a reading order of characters constituting the word. With this structure, a word recognition can be performed, the word recognition being applicable to a language in which a certain word is separated from the other words with a space as in English, and words are read according to a predetermined reading direction, e.g., according to a rule that a word is written from left to right.

Various preferable embodiments illustrated here can be combined to one another.

The correspondence between the present invention and the embodiments described below will be described.

In the present invention, the query image corresponds to a sheet containing plural characters or marks as illustrated in FIG. 1 described later. The pattern component is the word corresponding to a connected component. In the present invention, the query feature is a vector value indicating a characteristic of each pattern component of the query image.

In the present invention, the reference pattern corresponds to a connected component indicating each character in the character recognition. For example, the reference pattern corresponds to each character in FIG. 14(a), each pictogram in FIG. 14(b), and each pattern in a row on the first row (not on the second row) in a table of separated character in FIG. 10, described later. The reference feature represents the feature of each reference pattern, and is compared (matched) with the query feature. The discrete pattern table corresponds to the separated character table in FIG. 10 described later. In the example in FIG. 10, the discrete pattern table includes a group forming a character (j), and a group forming a character (i). In the present invention, the discrete pattern corresponds to each pattern on the first row (not on the second row) in the separated character table in FIG. 10, for example.

The present invention will be described in more detail with reference to the drawings. The description below should be considered in all respects as illustrative and not restrictive of the present invention.

1. Premise of Invention

The premise of the present invention will firstly be described, before the detailed description of the present invention is made. According to a conventional research in this technical field, it is assumed that black characters are written on a white paper for simplicity. The "black" is only illustrative, and a block of pixels having a predetermined color and/or density that can be distinguished from a background, and a block of pixels having a color and/or density within a predetermined range can be specified as the pattern region according to the present invention. For the sake of convenience, the pixel constituting the pattern region is referred to as "black pixel". Since character images are captured by a camera, they can suffer from perspective distortion and be degraded by defocus and low resolution. We assume, however, the connected components of the characters, i.e., the components that form one block in which the black pixels are adjacent to one another in the image, are extractable with a simple process. We also assume all characters in the image exist on a same plane.

In the present invention, there are three problems to be solved: (i) fast recognition of extracted connected components, (ii) robustness enhancement of recognition, (iii) recognition of separated characters which consists of more than one connected component such as "i" and "j".

For fast recognition in (i), a fast recognition method in which a geometric hashing is adapted to the matching of the connected component, and a principle of geometric invariant calculation is utilized, will be described in Section 2. For the robustness enhancement of recognition in (ii), a recognition method considering a pose of the connected component will be described in Section 4. For recognition of separated characters in (iii), a technique described in Section 3 solves the problem.

2. Improvement for Allowing Geometric Hashing to be Adapted to the Invention for Attaining High-Speed 2.1 Geometric Hashing The geometric hashing is a strong method for describing and searching an image, which undergoes a certain geometric distortion, by using invariant coordinate systems. In order to describe the improved method, proposed in the present invention, of the geometric hashing, the geometric hashing will briefly be described. It is suggested to refer to the document described below for the detailed description; Y. Lamdan and H. J. Wolfson, "Geometric hashing: a general and efficient model-based recognition scheme." Proc. ICCV 1988, pp. 238-249, 1988.

2.1.1 Storage

A reference image is stored. Let us assume that we have feature points extracted from a reference image. Three of them are randomly chosen and two bases are defined as shown in FIG. 2(a), considering the order of the selected feature points. Then, a new coordinate system is created as illustrated in FIG. 2(b) by using two bases, and the feature points are projected thereto. Since this coordinate system can be created in the same manner even if the image undergoes the affine transformation, this system is an affine invariant coordinate system. When the affine invariant coordinate system is divided into subregions as illustrated in FIG. 2(b), each subregion corresponds to a bin of a two-dimensional hash table. The image ID and basis-set ID are stored into each bin where each feature point exists. This process is executed to all possible bases, whereby a storage of one reference image is completed. The storage process finishes after all the reference images are stored. The computational cost of $O(P^3)$ is needed for creating the affine invariant coordinate system, and the computational cost of $O(P)$ is needed for projecting the feature point, so that the computational cost for storing one reference image becomes $O(P^4)$.

Here, $O(P)$ or $O(P^3)$ is a description method for a rough computational cost for solving the problem, wherein $O(P)$ indicates that the computational cost when P is determined falls within an order of a first power of P, i.e., the computational cost falls within not more than $aP+b$, while $O(P^3)$ indicates that the computational cost falls within an order of a third power of P, i.e., within not more than $P^2+cP+d$.

Here, a, b, c, and d are constants. The same is applied to $O(P^4)$ and the other cases.

2.1.2 Retrieval Process

The initial phase of the retrieval process is almost the same as that of the storage one. Let us assume we have feature points extracted from a query image. Three of them are chosen and two bases are defined as illustrated in FIG. 2(a) considering the order of the selected feature points. Then, an affine invariant coordinate system is created by using two bases. The affine invariant coordinate system is divided into subregions during the storage process, wherein each subregion corresponds to a bin of a two-dimensional hash table. The stored image ID and basis-set ID are extracted from each bin where each feature point exists, and the votes for the corresponding pairs of the image ID and the basis-set ID are cast (the voting table becomes two-dimensional). The procedure above is carried out for all sets of bases so as to determine the pair of the image ID and the basis-set ID with the highest vote. The image ID of this pair is outputted as the retrieval result. The process can quit when the output image is obvious before the procedure is carried out for all sets of bases. The computational cost of $0(P4)$ is needed for creating the affine invariant coordinate system, and the computational cost of O(P) is needed for projecting the feature point, so that the total computational cost becomes O(P4).

2.2 Proposed Improvement of Geometric Hashing 2.2.1 Different in Problem Definition The present invention relates to an improvement of the geometric hashing. Before describing the present invention, the difference in problem definitions between the geometric hashing and present invention will be described. The problem that the geometric hashing solves is to identify the object only with the arrangement of feature points, when the feature points are given. Specifically, it does not take into account from what feature points are extracted. To the contrary, in the present invention, when a figure is given, the figure is identified by using both the arrangement of the feature point acquired from the figure, and the feature of the figure. Specifically, the figure is determined by applying a predetermined rule to the pattern region. Therefore, a point that is not changed even if it undergoes the geometric transformation, such as a corner or inflection point acquired from the figure as the feature point can be used, but in the present invention, a pixel on a contour of the figure is specified as the feature point in principle. How the method is different from the geometric hashing with this process will be described later.

2.2.2 Reduction in Computational Cost

The lack of the geometric hashing is tremendous computational cost. The affine invariant version of the geometric hashing requires $O(P^4)$ for the retrieval process with respect to the number of P. If we have 100 points, it requires O(100,000,000). This means that the geometric hashing is never applicable to real-time applications. On the other hand, if the proposed method is used, the computational cost can be reduced to $O(P^2)$ considering the affine transformation, in case where the computational cost is the smallest.

The reason why the geometric hashing requires tremendous computational cost will be described below (see M. Iwamura, T. Nakai and K. Kise, "Improvement of retrieval speed and required amount of memory for geometric hashing by combining local invariants, Proc. BMVC 2997," Vol. 2. pp. 1010-1019, September 2007.) In the geometric hashing, in order to attain successful retrieval, the set of bases used in the storage process has to be subject to the computation in the retrieval process. However, whether the set of bases during the storage process agree with the set of bases during the retrieval process or not cannot be determined until the computation is completed, whereby the geometric hashing has to search the correspondence by examining all (or many) set of bases. If we can select the corresponding set of bases in the storage process and the retrieval process, the computational cost can be reduced. In view of this, in the proposed improvement of the geometric hashing, the same feature point is selected in the storage process and in the retrieval process, in order to reduce the computational cost needed for computing the same set of bases.

A method of selecting the feature point in order to reduce the computational cost in the present invention will be described. A method of selecting three points in the affine transformation will firstly be described as one example. In the affine transformation, the center of gravity of the figure is stored, so that the center of gravity is specified as the first feature point (there is no assurance that the center of gravity is present on a contour, but it is no problem). The second point is suitably selected as in the geometric hashing.

Figure 4:
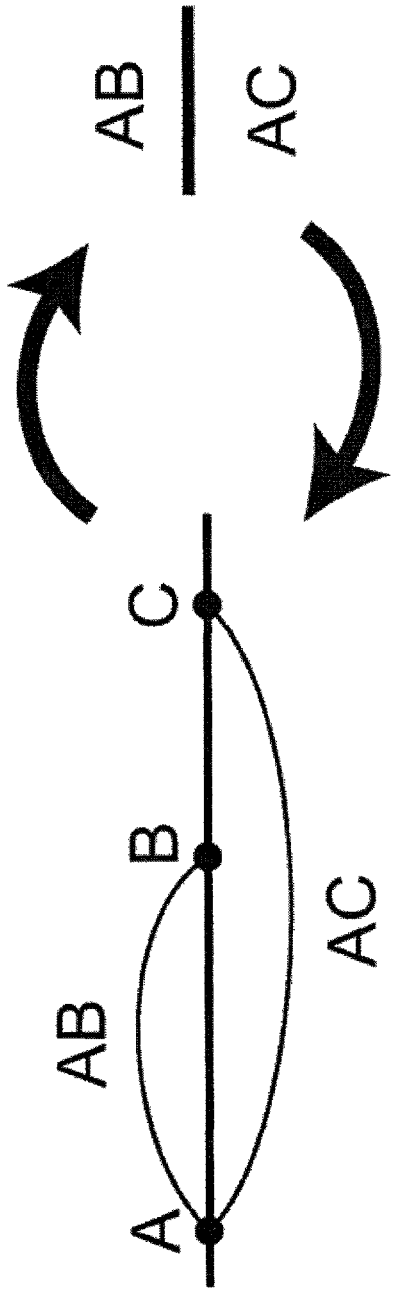
FIG. 4 is an explanatory view illustrating one example of an invariant of an affine transformation that is one type of a geometric transformation according to the present invention.

The third point is automatically determined from two points acquired before and a characteristic of an invariant described below. Firstly, the characteristic of the invariant will be described with the use of the example in FIG. 4, which is the simplest example. When three points A, B, and C are given on one straight line as illustrated in FIG. 4, AB/AC is an invariant to affine transformation. The calculation of the invariant from the coordinate of the point is usually carried out. On the other hand, in the present invention, the coordinate of C is determined by the invariant and the coordinates of A and B. Assuming that A, B, and C are on the same line, C can be the left side of A or the right side of B. If the method of determining C is defined in advance, such as "C is determined in such a manner that A, B, and C are on the same line in this order", the position of C can uniquely be determined. In the generalized form of the principle is that "If we have the value of the invariant and the coordinate of n−1 points out of coordinates of n points, we can determine the last point (n point)."

Such a unique determination of the position of the feature point, which is used to create a base, helps to reduce computational cost. This procedure reduces the computational cost from $O(P^4)$ to $O(P^2)$ since the two points are uniquely determined.

However, the procedure above determines three points on the same line, resulting in that a base that is linearly independent on the bases created at the first and second points by utilizing the third point cannot be created (it is to be noted that the third point can be added to feature vectors described later to be used for the calculation of an index of a hash described later).

Figure 5:
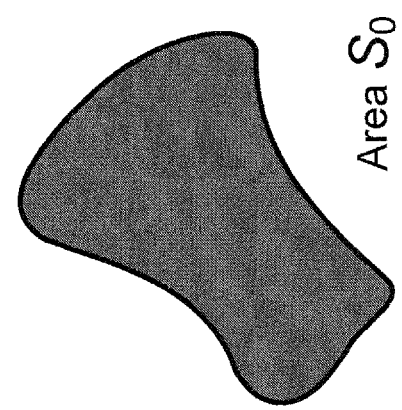
FIG. 5 is an explanatory view illustrating an example of a shape of a pattern region according to the present invention.

Another method to determine the third point for a figure whose area is $S_0$ shown in FIG. 5 will be described below. According to this method, the base that is linearly independent on the bases created at the first and second points can be created. Table 1 illustrates the characteristics stored in the affine transformation.

TABLE 1

| Characteristic stored in affine transformation | |
|---|---|
| Characteristic 1 | Straight line is stored as straight line. |
| Characteristic 2 | Center of gravity of figure is stored. |
| Characteristic 3 | Ratio of line segment created by three points on the same straight line is stored. |
| Characteristic 4 | Area ratio of two regions is stored. |

Method 1 of Selecting Feature Point

Figure 6:
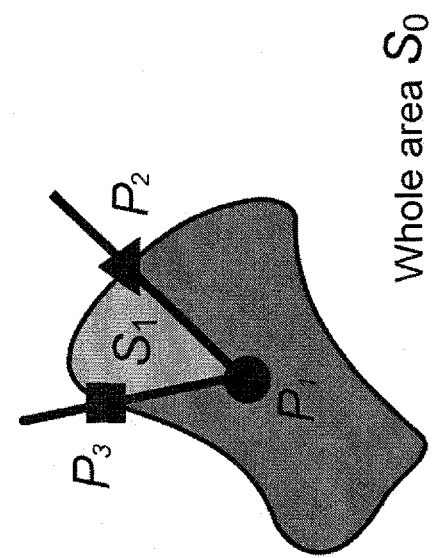
FIG. 6 is an explanatory view illustrating a first technique for determining a third feature point from a center of gravity of the pattern region and a predetermined area ratio, which is the affine invariant, according to an embodiment of the present invention.

Let us assume three feature points are given as illustrated in FIG. 6. Let us assume a half line passing through the first point and the second point, and a half line passing through the first point and the third point, wherein an area extracted from the figure is specified as $S_1$. In this case, $S_1/S_0$ becomes the value of the affine invariant from the characteristic 4 in Table 1. Accordingly, the third point may be determined so that $S_1/S_0$ equals a predetermined value. To determine uniquely the third point, the order in clockwise or anticlockwise is usable.

Method 2 of Selecting Feature Point

Figure 7:
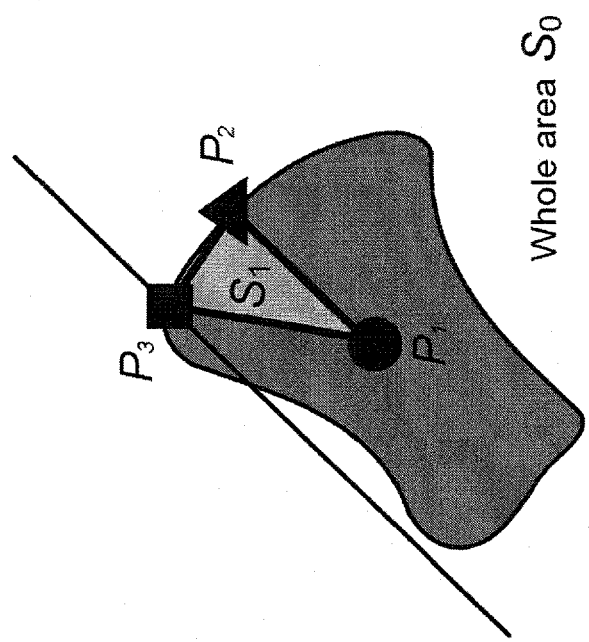
FIG. 7 is an explanatory view illustrating a second technique for determining a third feature point from a center of gravity of the pattern region and a predetermined area ratio, which is the affine invariant, according to the embodiment of the present invention.

Let us assume three feature points are given as illustrated in FIG. 7 as in the method 1. When the area of the triangle formed by three points is specified as $S_1$, $S_1/S_0$ becomes the value of the affine invariant from the characteristic 4 in Table 1. Accordingly, the third point may be determined so that $S_1/S_0$ equals a predetermined value. $S_1/S_0$ is not always limited to the predetermined value, but may be the maximum value or the minimum value. To determine uniquely the third point, the order in clockwise or anticlockwise is usable. When it is considered that the third point is determined in such a manner that $S_1$ becomes constant, the trajectory of the third point is a line parallel to the line through the first and second points as illustrated in FIG. 7. Therefore, the third point is easily determined as the intersection of the line and the external contour, which means the third point can easily be computed. If there are plural intersections, it is also possible to determine the point closer to the second point as the third point, for example.

Figure 8:
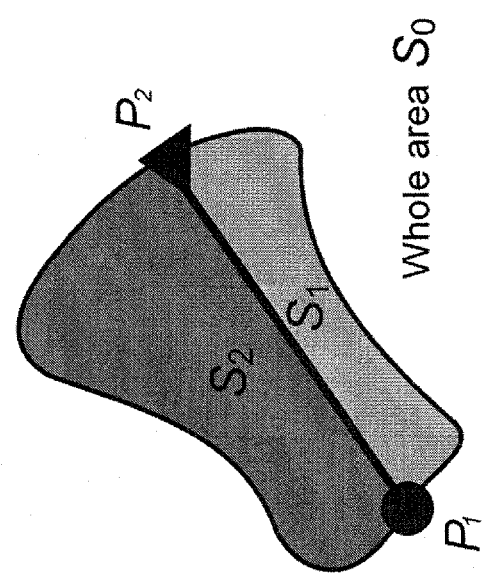
FIG. 8 is an explanatory view illustrating a technique of determining a second feature point from a predetermined area ratio, which is the affine invariant, without specifying the center of gravity as the feature point according to the embodiment of the present invention.

The first two points can be determined by the method different from the method described above. Specifically, the first point is appropriately selected from P points, and the area ratio is utilized for determining the second point, as in the geometric hashing. When two feature points are given as illustrated in FIG. 8, the area ratio of $S_1/S_0$ becomes the value of the affine invariant. Therefore, the second point may be determined so that $S_1/S_0$ equals a predetermined value.

2.2.2 Use of Feature of Figure

Figure 9:
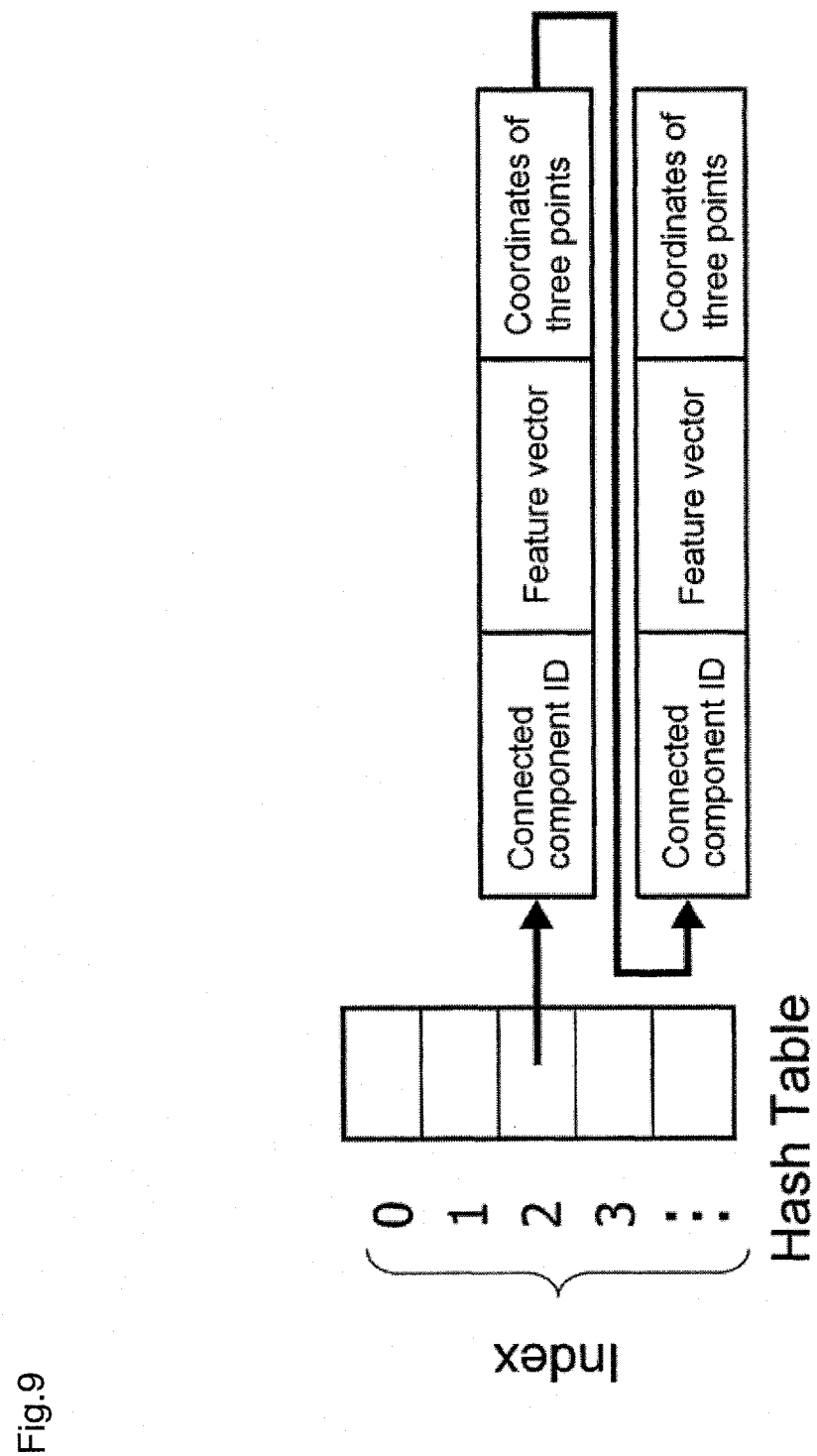
FIG. 9 is an explanatory view illustrating a structure of a hash table included in a database according to the present invention.

In the geometric hashing, a set of image ID and basis-set ID is stored in the database. On the other hand, in the present invention, the feature vector computed from the image and the coordinate of the feature point used for creating the base are stored, instead of the basis-set ID (see FIG. 9).

The reason why the feature vector calculated from the image is used is because the feature of the image is more expressive. In the problem definition of the geometric hashing, only the coordinate of the feature point extracted from the retrieval target is given. However, in the problem of the present embodiment, the figure itself, which is the retrieval target, is given. Therefore, the feature vector extracted from the figure can be used. The reason why the coordinates of the feature vectors used for creating the bases are stored is because the precision in estimating a pose and a recognition precision can be enhanced by using the coordinates during a later-described voting process.

In order to specialize the description as a character recognition that is a representative example of a pattern recognition according to the present invention, the "image ID" is referred to as "character ID" below. The "retrieval" is referred to as "recognition". The "pattern recognition apparatus" is referred to as "character recognition apparatus".

3. Recognition of Separated Characters

In the previous section, a method of recognizing the character consisting of a single connected component with high speed has been described. In this section, a recognition method of separated characters which consist of more than one connected components such as "i" and "j" will be described in this section.

Figure 10:
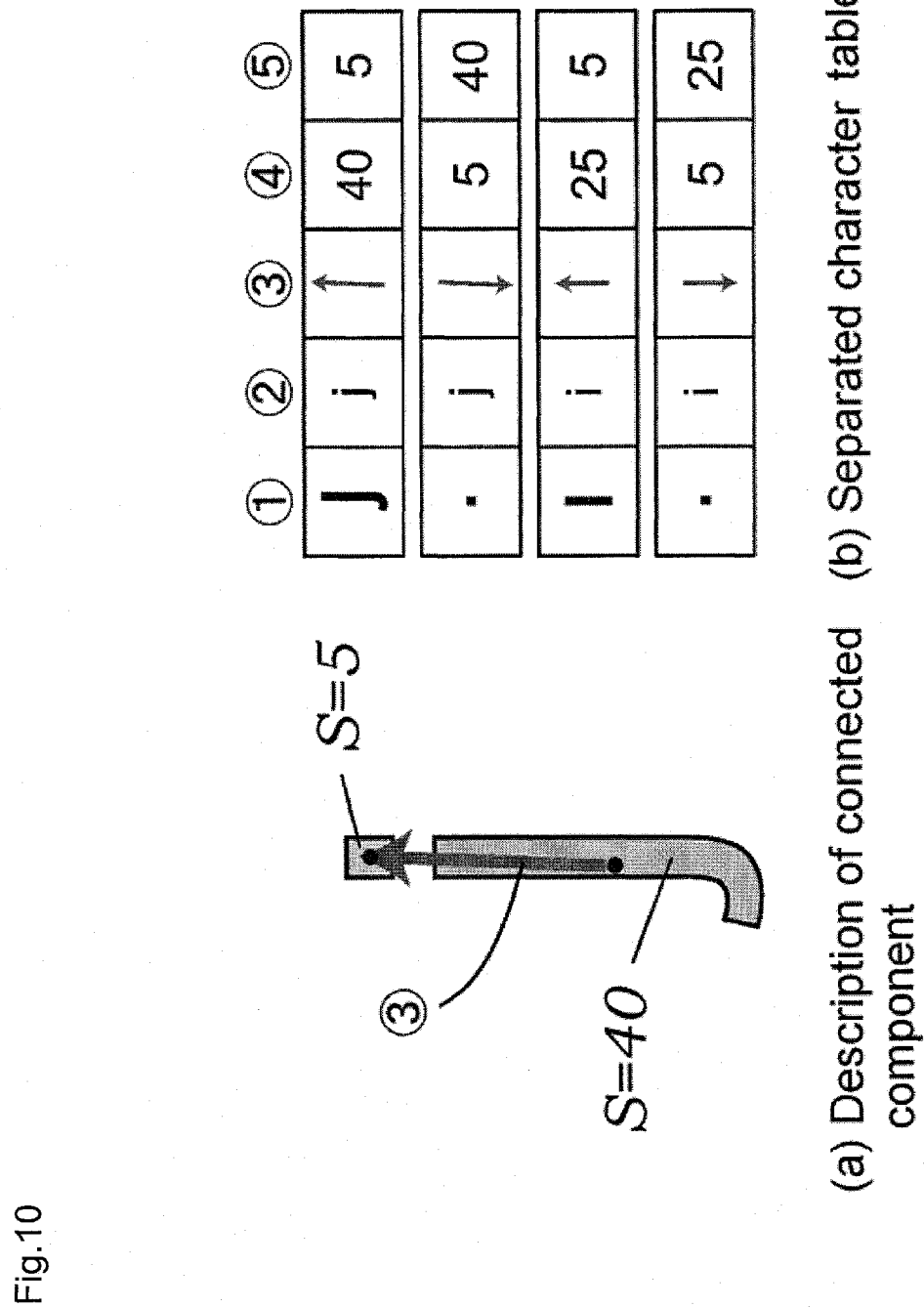
FIG. 10 is an explanatory view illustrating a method of describing a separated character according to the present invention.

FIG. 10 is an explanatory view illustrating a method of describing a separated character according to the present invention. FIG. 10(a) illustrates that the separated character is described by an area of each connected component forming the separated character and a vector indicating the relative position of the components. FIG. 10(b) illustrates one example of a separated character table for describing the separated character. In order to handle the separated character, in the storage process of a reference image, the number of the connected components in the image is counted. For the reference image containing two or more connected components, each connected component is handled as a different character, is independently stored, and is registered into the separated character table in FIG. 10(b).

The table stores the relative positions and sizes between the connected components of a character to recognize a separated character, wherein a separated character can be recognized by checking whether a predetermined connected component is present or not at a predetermined position during the recognition. The separated character table in FIG. 10(b) includes five factors, wherein they are numbered as No. 1 to No. 5 sequentially from the left end. The first factor indicates the shape of the connected component and/or the number of the connected component. The second factor indicates the separated character containing the connected component. The third factor is a vector indicating the relative position of the connected components. The fourth factor indicates the area of the connected component. The fifth factor indicates the area of the connected component that should be paired.

In the case of Arial font, the bottom connected component of "i" has the same shape of "I (capital ai)" and "l (lowercase el)," and they are indistinguishable. Thus, in order to recognize "i" correctly, each connected component of the same shape such as "I" and "l" must be checked whether it is a part of "i" or not. If the top of the connected component "i" exists in the right position and size, the pairs of the connected components are recognized as "i", and if not, they are recognized as "I" or "l".

In order to realize the process above, all connected components in the same shape are stored so as to have the same connected component ID. That is, storing reference character images is processed one by one and each image is checked whether connected components in the same shape are already registered or not. In further detail, before storing a reference image, it is recognized using the database in process of creation, and the same connected component ID is assigned if connected components in the same shape are found. Ideally, the bottom connected component of "i", "I", and "l" have the same connected component ID. However, this method turned out not to get along with the generative learning mentioned below, and some connected components did not have the same connected component ID. Therefore, in the present embodiment, connected component IDs were manually set up according to the similar character list shown in Table 2.

4. Pattern Recognition Considering Pose of Connected Component

Figure 11:
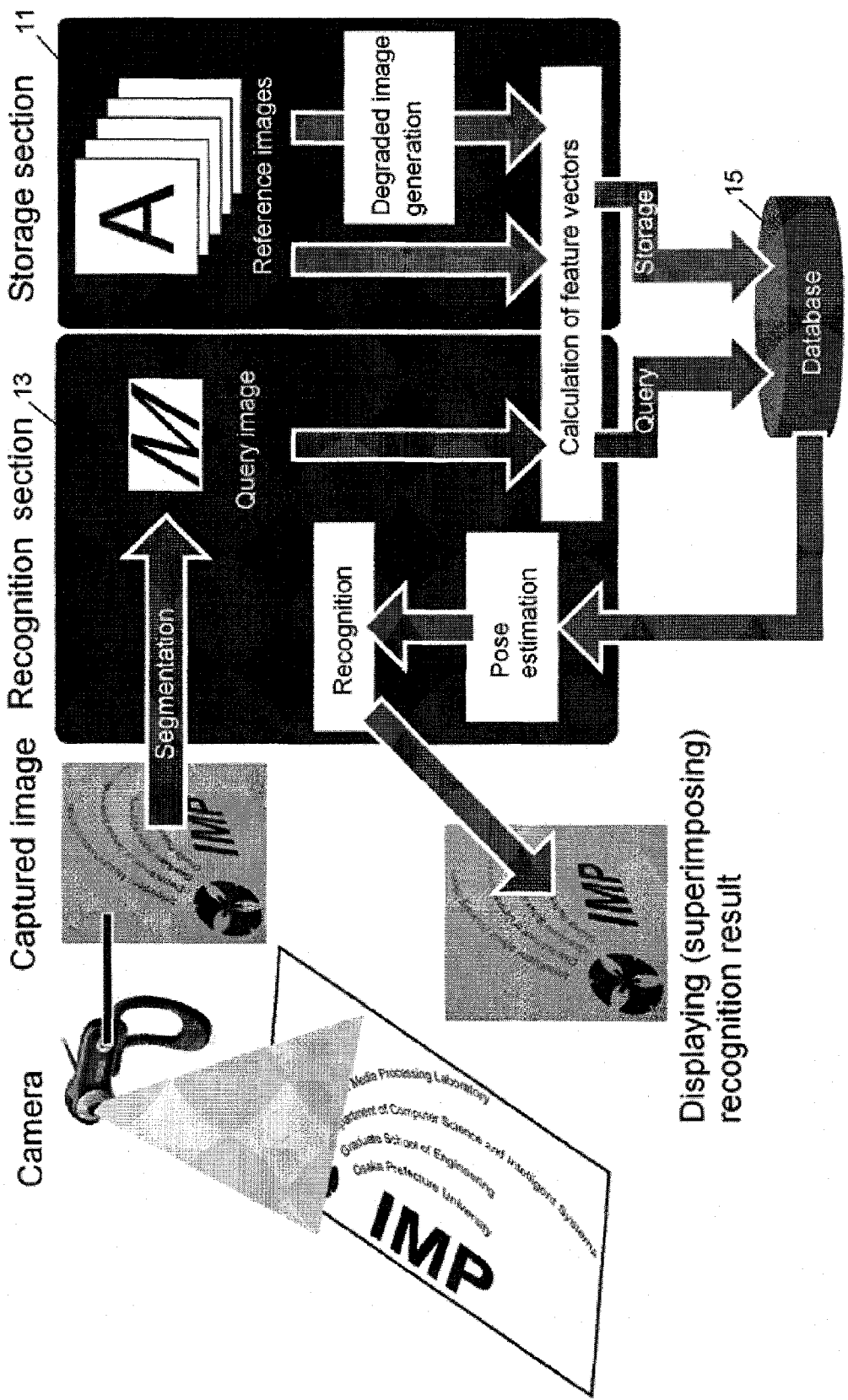
FIG. 11 is an explanatory view illustrating a flow of a process executed by the pattern recognition apparatus according to the present invention.

FIG. 11 illustrates an outline of a pattern recognition apparatus according to the present invention. The apparatus roughly includes an image storing section 11 and an image recognizing section 13. The character recognition apparatus according to the present invention includes the image recognition section 13 that is accessible to at least a database 15. The respective sections will be described below.

4.1 Image Storing Section

A reference image is stored in the database 15 in the image storing section 11. The reference image is supposed to be a binary image.

4.1.1 Degraded Image Generation

In order to cope with degradation caused by defocus and low resolution, a generative learning in which Gaussian blurring is applied to the reference image is employed (see H. Ishida, S. Yanadume, T. Takahasi, I. Ide, Y. Mekada and H. Murase, "Recognition of low-resolution characters by a generative learning method," Proc. CBDAR 2005, pp. 45-51, 2005). A brightness of a pixel at a position (x, y) of an original image is defined as $I_0(x, y)$, a brightness $I_g(x, y)$ at the position (x, y) of the generated degraded image is given by an equation below.

[Equation 1]

$$I_g(x, y) = \frac{\sum_{x'=0}^{W-1} \sum_{y'=0}^{H-1} \left[\exp\left\{-\frac{(x-x')^2 + (y-y')^2}{2\sigma^2}\right\} I_0(x', y')\right]}{\sum_{x'=0}^{W-1} \sum_{y'=0}^{H-1} \exp\left\{-\frac{(x-x')^2 + (y-y')^2}{2\sigma^2}\right\}} \quad (5)$$

In the equation, W and H are a width and height of the image. The degree of defocus is adjusted by a standard deviation σ of a convolved normal distribution. The generated degraded image is again binarized, and treated as additional reference image.

4.1.2 Feature Vector Calculation

A feature vector is created by selecting three feature points, and creating the invariant coordinate system according to the method described in Section 2. A method of calculating the feature vector from the acquired three points will be described below. If there are two feature points, one straight line passing through two points can be determined, so that three straight lines in total can be calculated from three points.

[Equation 2]

$$\binom{3}{2} = 3$$

Figure 12:
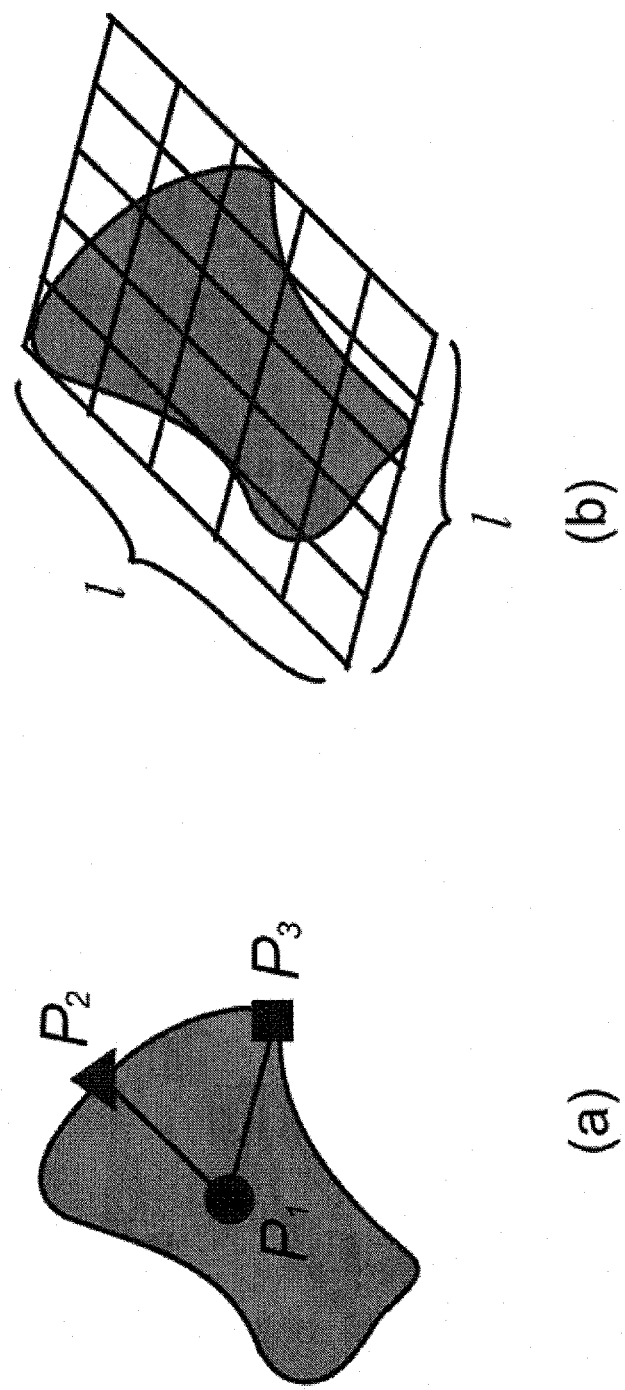
FIG. 12 is an explanatory view illustrating one example of a calculation method of a feature vector according to the present invention.

When two of three straight lines are selected, k uniform subregions illustrated in FIG. 12 can be set. Here, an equation of k=1×1 is established. Setting the subregions as described above equals to the setting of lattice in the invariant coordinate system determined by two bases in the geometric hashing in FIG. 2(b). The number of the feature points in each subregion is counted, and the figure is normalized in such a manner that the total becomes 1, whereby a k-dimensional feature vector can be calculated. For the calculation of the value in each subregion, not only the pixels on the contour but also all pixels in the figure can be used. There are three combinations of selecting two from three straight lines considering the order, so that three k-dimensional feature vectors can be calculated. A (3k)-dimensional feature vector can be calculated by simply concatenating three k-dimensional feature vectors.

4.1.3 Storage into Database

The database 15 is specifically composed of a hash table.

The storage method to the database 15 will be described. A character ID, a feature vector, and the coordinates of three points are stored in the hash table as one set. An index $H_{index}$ of the hash is calculated according to an equation below.

[Equation 3]

$$H_{index} = \left(\sum_{i=1}^{3k} D^{i-1} r_i\right) \bmod H_{size} \tag{6}$$

In the equation, $H_{size}$ is the size of the hash table, and $r_i$ is the value of the i-th element of the feature vector, and D indicates that the i-th element of the feature vector is quantized into D levels. Entries are stored using the list structure if collisions occur.

4.2 Image Recognition Section

4.2.1 Image Acquisition

An image is captured by a digital camera or a web camera as a still image or a movie. A movie is decomposed into frame images, and handled as plural still images. The acquired images are referred to as query images, and used in the process described below.

4.2.2 Segmentation of Character Image

A character image is extracted from the acquired image. The image is adaptively thresholded into the binary image. The adaptive binarization technique is a method of determining whether the brightness of a target pixel is white (brightness 1) or black (brightness 0) depending upon whether it is bright or dark from an average brightness of a neighboring region. When the brightness of the pixel of the original image at the position (x, y) is defined as $I_0(x, y)$, and the window size of the neighboring region is defined as n×n pixels, the brightness Ib(x, y) of the binarized image acquired by applying the adaptive binarization is represented by an equation below.

[Equation 4]

$$I_b(x, y) = \begin{cases} 1 & \text{if } I_0(x, y) > \dfrac{\sum_{x'=-n/2}^{n/2} \sum_{y'=-n/2}^{n/2} I_0(x-x', y-y')}{n^2} \\ 0 & \text{otherwise} \end{cases} \tag{7}$$

Next, a connected component is extracted. The connected component means a block of black pixels adjacent to one another in the image. The acquired connected component is extracted in a rectangular form as being regarded as a candidate of the pattern region, and specified as a recognition target described below. When the area of the acquired connected component is not more than a threshold value, it is regarded as a noise, and excluded from the recognition target.

4.2.3 Feature Vector Calculation

Feature vectors are calculated from the acquired connected component. The process is almost the same as that described in Section 2. The only difference is that the number of feature vectors is restricted to S, which is preliminarily determined, without creating the invariant coordinate system for all possible combinations.

4.2.4 Parameter Estimation and Recognition Using Voting Procedure (Embodiment 1)

An estimation and recognition of a parameter are carried out by using a voting procedure. The case of the affine transformation will be described here.

Firstly, S sets of the character ID, feature vector, and the coordinates of three feature points are acquired from the hash table. Then, a weighted voting using a weight represented by an equation 5 is performed to the character ID.

[Equation 5]

$$V = \frac{1}{\sqrt{P}}$$

The reason why the voting is weighted is the number P of feature points (length of a contour) is different in respective characters, and a character component which has a large number of feature points may have unfairly large number of votes. Let M be the number of the highest vote acquired by the weighted voting. Based upon this value, two groups are specified from the weighed voting. The one of them is a group of characters which have larger number of votes than 0.9 M, and this group is referred to as "estimation group". The other one is a group of characters which have larger number of votes than 0.8 M, and this group is referred to as "candidate group".

One affine transformation matrix is calculated from the correspondence between three coordinates acquired from the query image and three coordinates in the database (It is to be noted that the positional deviation is not considered in the affine transformation matrix). Since S sets of three coordinates acquired from the query image, S affine transformation matrices in total can be acquired. Each affine matrix transformation T is decomposed into four parameters: scaling β, rotation θ, shear φ, and independent scaling α as in an equation described below.

[Equation 6]

$$T = L(\beta)R(\theta)S(\varphi)A(\alpha) \quad (8)$$

$$= \begin{pmatrix} \beta & 0 \\ 0 & \beta \end{pmatrix}\begin{pmatrix} \cos\theta & -\sin\theta \\ \sin\theta & \cos\theta \end{pmatrix}\begin{pmatrix} 1 & \tan\varphi \\ 0 & 1 \end{pmatrix}\begin{pmatrix} \alpha & 0 \\ 0 & 1/\alpha \end{pmatrix} \quad (9)$$

In the equation,

[Equation 7]

$$\alpha = \pm\sqrt{\frac{a^2 + c^2}{ad - bc}} \quad (10)$$

$$\varphi = \tan^{-1}\frac{ab + cd}{ad - bc} \quad (11)$$

$$\theta = \cos^{-1}\frac{\pm a}{\sqrt{a^2 + c^2}} \quad (12)$$

$$\beta = \pm\sqrt{ad - bc} \quad (13)$$

In this embodiment, it is assumed that all the characters in the query image are on the same plane. In this case, parameters of shear φ and independent scaling α must be equal in all characters. By utilizing a densest point estimation in a two-dimensional space of φ and α, the best parameters of them are determined. Here, the affine transformation matrices of the characters belonging to the "estimation group" are plotted in the above-mentioned two-dimensional space. The neighboring point having the highest density is selected from the plotted points. This process is carried out in such a manner that respective parameters φ and α are divided into five, and the two-dimensional space is divided into 25. The points included in each of 25 subregions and neighboring 8 regions, i.e., in 9 regions in total, are counted, and the counted number of points is specified as a score of this region. After the scores of all regions are calculated, the region having the highest score is selected. If the points included in this region exceeds 30, this region is again divided into 25, and the similar process is repeated until the number of the points becomes not more than 30. When the number of the feature points included in the region having the highest score becomes not more than 30, the value of the center of this region is specified as an estimation value of φ and α, and defined as $$\hat{\varphi}, \hat{\alpha} \quad \text{[Equation 8]}$$

respectively.

Finally, the recognition result is determined for each of the connected component. In the two-dimensional space of φ and α, the closest point in the affine transformation matrices of the characters belonging to the "candidate group" is selected from $$(\hat{\varphi}, \hat{\alpha}), \quad \text{[Equation 9]}$$

and the character that gives the affine transformation matrix is defined as the recognition result (first candidate). If two recognition results are required, the closest point is selected from $$(\hat{\varphi}, \hat{\alpha}), \quad \text{[Equation 10]}$$

except for the first candidate, and the selected one is specified as a second candidate. The similar process is repeated afterward.

4.2.5 Different Pose Estimation and Recognition (Embodiment 2)

Figure 13:
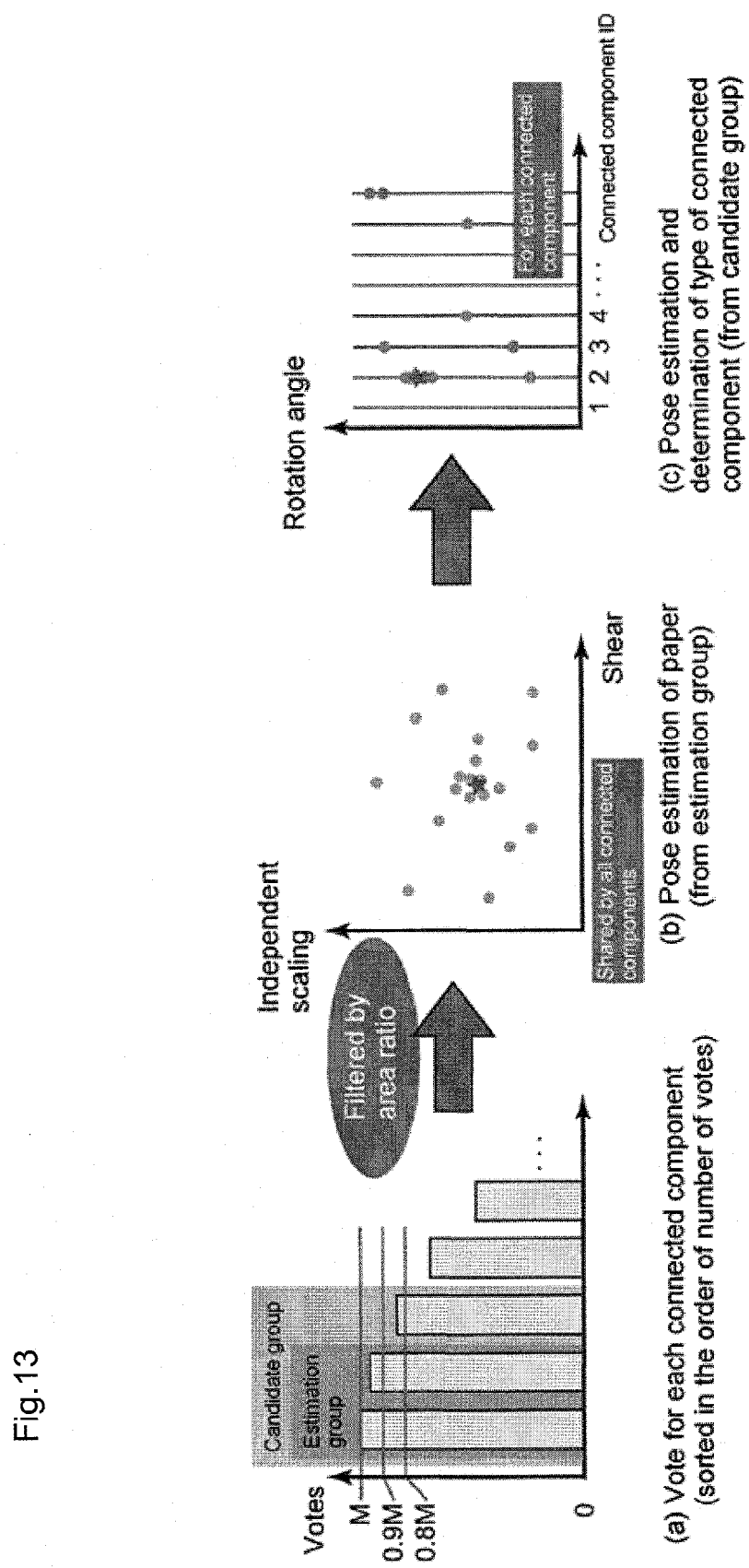
FIG. 13 is an explanatory view illustrating one example of a procedure of a pose estimation method in the embodiment according to the present invention.

A pose estimation different from that described in the previous section will be described. By using the feature vector described in section 4.2.3, the connected component ID and the coordinates of three feature points can be acquired from the hash table illustrated in FIG. 9. The information acquired as described above is a temporary recognition result, and includes many errors. The information is corrected to a proper recognition result by using a few steps of a majority rule, similar to that described in the document of M. Iwamura, R. Niwa, A. Horimatsu, K. Kise, S. Uchida and S. Omachi, "Layout-free dewarping of planar document images, Proc. DRR XVI," 7247-36, January 2009. Specifically, as illustrated in FIG. 13, the pose estimation of the paper is firstly performed, and then, recognition and pose estimation of each connected component are done.

Firstly, from the correspondence between feature points in the query image and a reference image, the pose of the connected component in the query image is calculated as an affine transformation matrix. Since the affine transformation matrices include a wrong matrix acquired as being associated with another connected component, the affine transformation matrices are filtered by weighted voting of connected component ID for each connected component as illustrated in FIG. 13(a) in order to select a reliable one. The reason why the voting is weighted is a connected component which has many feature points have unfairly large number of votes. Letting Ni be the number of feature points (the length of the external contour) of i-th connected component, the weight of $1/\sqrt{Ni}$ is applied to each voting.

Two groups are specified on the basis of the number of the highest vote (M) acquired by the weighted voting. The one of them is a group of connection components, which have larger number of votes than 0.9 M, in the reference image, and this group is referred to as "estimation group". The other one is a group of connection components, which have larger number of votes than 0.8 M, and this group is referred to as "candidate group".

These groups are determined for each of the connected components of the query image.

Secondly, the pose of the paper is estimated. In the present invention, it is assumed that all the characters exist on the same plane (paper). In this case, all connected components are expected to share the same parameters of shear and independent scaling among four affine transformation parameters calculated from the affine transformation matrix. Thus, as similar to the above-mentioned document, a pair of plausible parameters is estimated by using density estimation in the two-dimensional space as illustrated in FIG. 13(b). That is, affine transformation matrices of the estimation group are plotted in a two-dimensional space.

The densest point (represented by a red star mark in FIG. 13(b)) is selected from the plotted points. In order to increase reliability of the estimation, only connected components satisfying $T_{area} \leq R/\beta^2 \leq 1/T_{area}$ are used for the estimation, where R is the area ratio of the connected component of the query image and the corresponding connected component of the reference image, and β is the scaling parameter calculated from the affine transformation matrix. If the temporary recognition result of the connected component is correct, the equation of $R/\beta^2=1$ is established, so that the value not close to 1 means that the result cannot be reliable. In the present embodiment, $T_{area}=0.7$ was used.

Finally, the recognition result of each connected component is determined. As shown in FIG. 13(c), a pair of plausible rotation angle and recognition result of the connected component is estimated by using density estimation in the two-dimensional space. Affine transformation matrices of the candidate group are used for the estimation. The difference from FIG. 13(b) is that the density estimation is carried out in one-dimensional space since the connected component ID is a discrete value, although the rotation angle is a continuous value. According to the procedure described above, the type (connected component ID) and the pose (shear, independent scaling and rotation) of the connected component can be estimated.

5. EXPERIMENTAL EXAMPLE 1

Embodiment 1 not Using Recognition Method of Separated Character

Four degraded images were generated for one reference image with σ being changed. The value of σ used here was σ=0, 2, 4, and 6. The parameter n for the adaptive binarization was 101, and the threshold value that was eliminated as being regarded as noise was 32. The hash size was $H_{size}=2^{19}-1$.

In order to reduce the computational cost, the connected component was extracted from the reference image during the storage process of the image, and the extracted image was normalized so that the largest size of the width and height of an image was 100 pixels. During the image recognition process, the image was normalized so that the largest size of the width and height of the connected component extracted from the query image was 500 pixels.

For the calculation of the values of the respective regions for creating the feature vector, not only the pixels on the contour but also all pixels in the figure were used.

In the experiment described below, a computer having a CPU of Opteron 2.4 GHz and a memory of 128 GB was used.

5.1 Performance Evaluation of Various Fonts

In order to confirm the effectiveness of the present invention, characters in various fonts were recognized. 60 characters of numerals and alphabets were employed: 10 figures, 24 lowercase alphabets excluding "i" and "j", and 26 capital alphabets. Since some characters are difficult to distinguish under affine distortions, the characters in a cell in Table 2 were treated as the same class in all experiments. For example, even if 0 (zero) is erroneously recognized as O (ou), this case is not regarded as the erroneous recognition.

TABLE 2

| 0Oo | 69 | Cc  | Il | Ss | un   |
|-----|----|-----|----|----|------|
| Ww  | Xx | NZz | pd | qb | 7LVv |

Four types of fonts, which are Arial, Century, Gigi, and Impact, illustrated in FIG. 14(a) were used for the experiment. A test pattern illustrated in FIG. 15 was prepared as a recognition target. The test pattern includes characters in nine conditions which were the combinations of three different sizes (72 pt, 48 pt, 32 pt) and three different rotation angles (0, 30, and 45 deg.). The test pattern includes 12 characters for each condition, so that the test pattern contains 108 characters in total. 60 test patterns were prepared for 60 characters. Each of the printed test patterns was captured in three different angles (0, 30, and 45 deg.) by a digital camera. The resolution of the camera was 1024×768. S=200 and k=25 were used as the parameters of the experiment.

Figure 16:
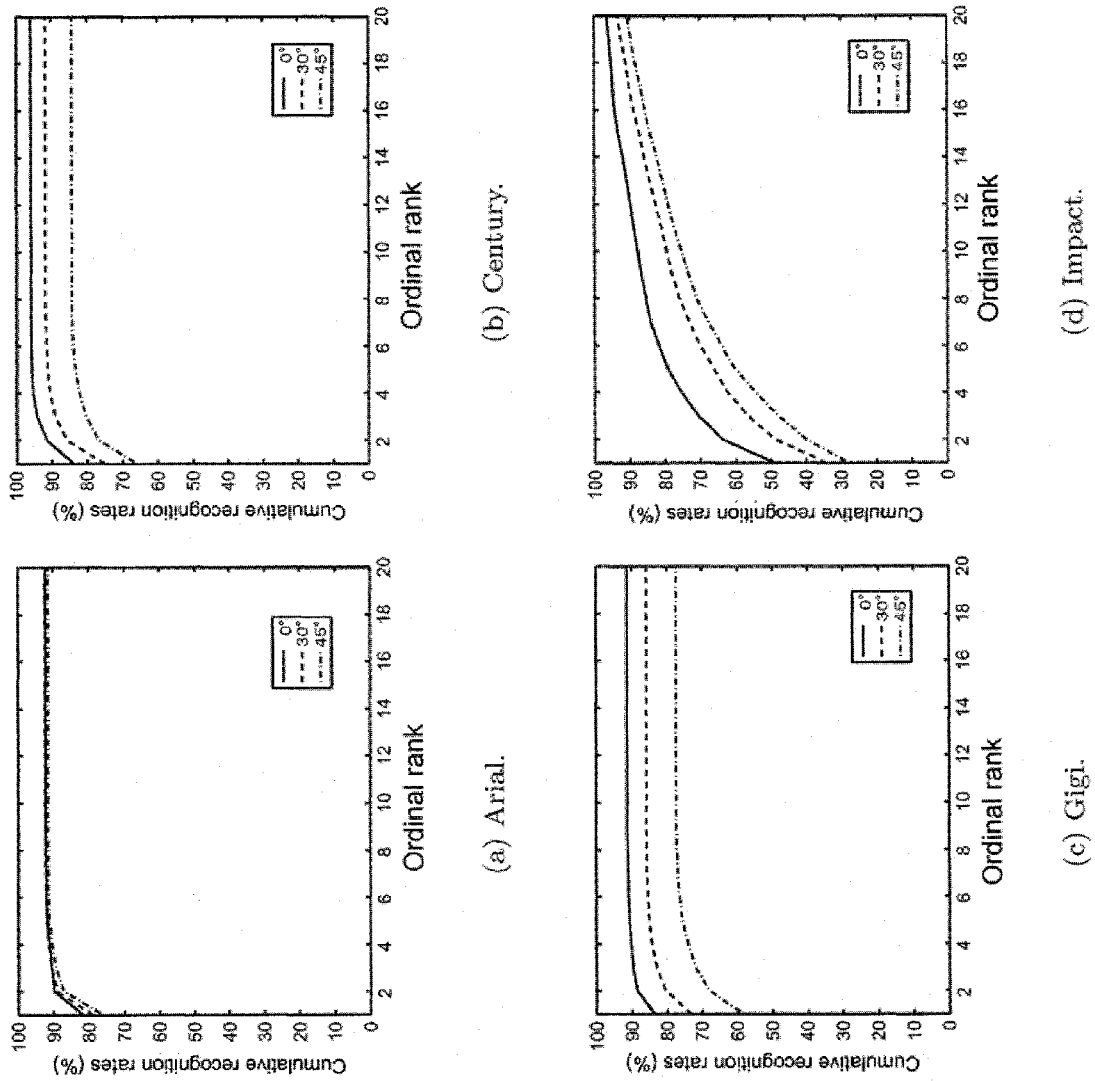
FIG. 16 is a graph illustrating a first result of the experimental example 1 according to the present invention, wherein cumulative recognition rates to fonts of plural types are illustrated.

The cumulative recognition rates and average processing time are shown in FIG. 16 and Table 3, respectively. As the rank increased, the cumulative recognition rates of Arial, Century and Gigi increased and became flat around 6$^{th}$ rank. On the other hand, the recognition rate of Impact was very bad in the 1$^{st}$ rank, and increased until 20$^{th}$ rank.

TABLE 3

Average processing time for recognition of a letter

|  | Font | | | |
|---|---|---|---|---|
|  | Arial | Century | Gigi | Impact |
| Proc. Time (ms) | 32.4 | 24.7 | 24.0 | 81.0 |

Figure 17:
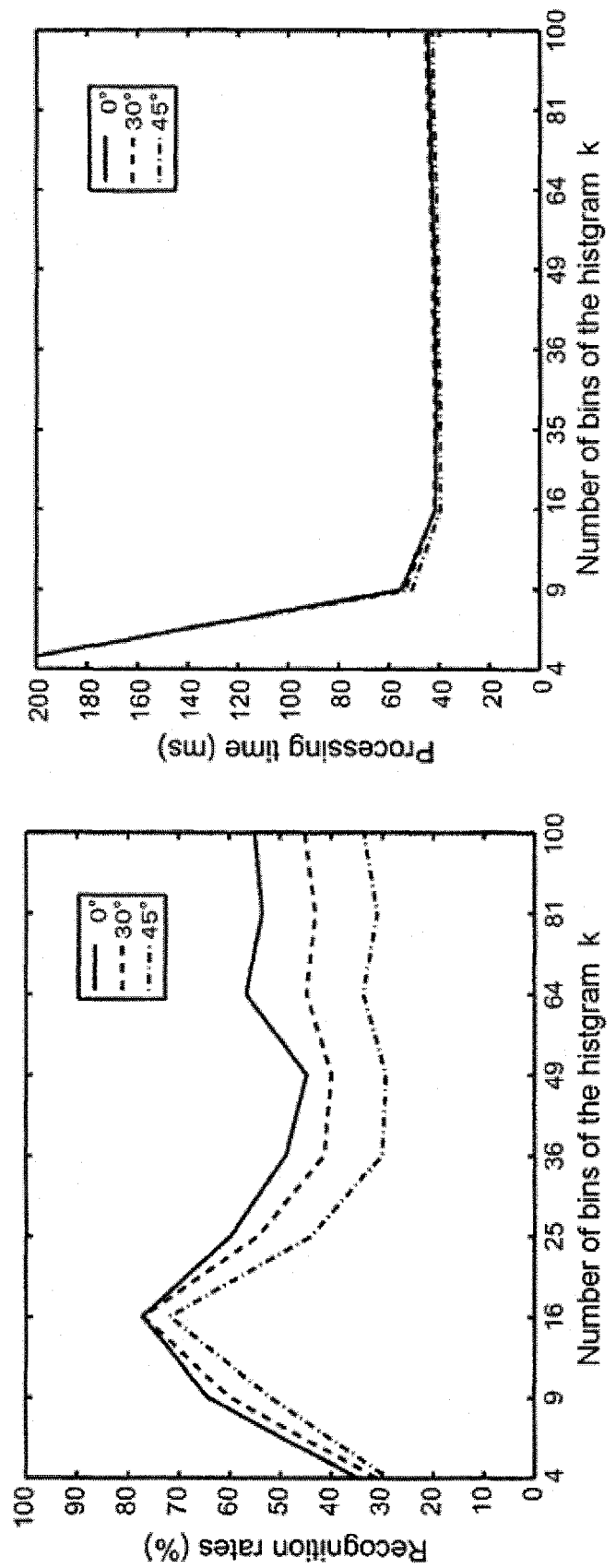
FIG. 17 is a graph illustrating a second result of the experimental example 1 according to the present invention, wherein a relationship between a recognition rate of a pictogram and a processing time is illustrated, when a size of a feature vector is changed.

5.2 Performance Evaluation for Pictograms 10 pictograms illustrated in FIG. 14(b) were captured in the same manner as in Section 3.1, and recognized using S=200. The recognition rates and processing time are illustrated in FIG. 17. The highest recognition rate was achieved in the case of 16 bins. The number of bins almost did not change processing time except the case of four bins where the processing time was extremely increased. The recognition rate was the lowest in the case of four bins. This is because many collisions occur in the hash, since the discrimination ability of the feature vector was insufficient.

5.3 Performance Evaluation of Text in FIG. 1

Figure 18:
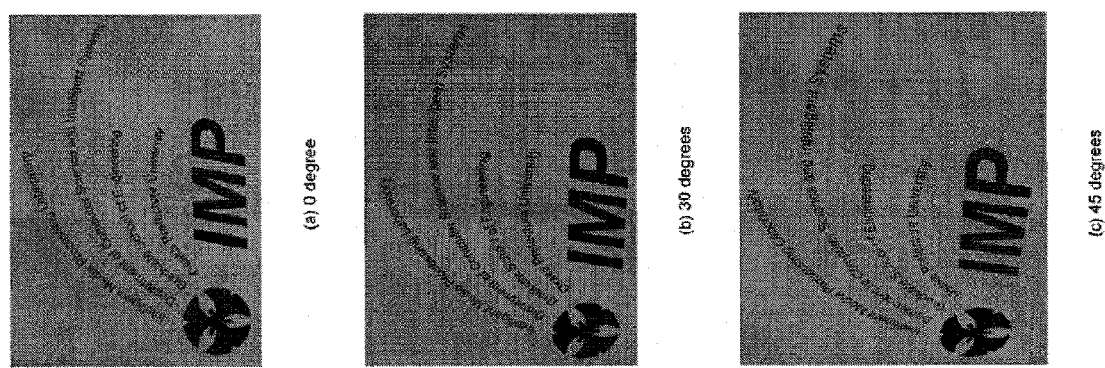
FIG. 18 is an explanatory view illustrating a state in which the image in FIG. 1, which is a recognition target according to the present invention, is captured with the geometric transformation.

Finally, the text illustrated in FIG. 1 was recognized. The text was captured with the digital camera being tilted at an angle of 0, 30, and 45 degrees with respect to the paper, and only the paper portion was extracted in order that the background is not present. The sizes of the extracted images at an angle of 0, 30, and 45 degrees were 2054×1464, 1714×1326, and 1516×1322, respectively. The acquired images were illustrated in FIG. 18. 148 connected components were acquired from the characters in FIG. 1, wherein 18 connected components out of 148 were the parts of "i" and "j". Since "i" and "j" contains two or more connected components, they are not contained in the reference image.

Therefore, these two characters cannot be recognized. Thus, the recognition rates were calculated using 148−18=130 characters. K=25 was used. Table 4 illustrates the recognition rate and the processing time. The case of S=200 achieved higher recognition rates than in the case of S=20. The processing time in the case of S=20 was about 7 times faster than in the case of S=200, although the recognition rates of them do not differ so much. The result of S=20 supports that the present invention provides a high-speed and robust recognition.

TABLE 4

Recognition rates and whole processing time for text in FIG. 1

|  | S | | | | | |
|---|---|---|---|---|---|---|
|  | 200 | | | 20 | | |
|  | Angle (deg.) | | | | | |
|  | 0 | 30 | 45 | 0 | 30 | 45 |
| Rate (%) | 91.5 | 93.1 | 86.9 | 90.0 | 86.2 | 83.9 |
| Time (ms) | 5400 | 5210 | 4790 | 740 | 710 | 640 |

6. EXPERIMENTAL EXAMPLE 2

Embodiment 2 Using Recognition Method of Separated Character

6.1 Performance Evaluation for Various Fonts

Figure 14:
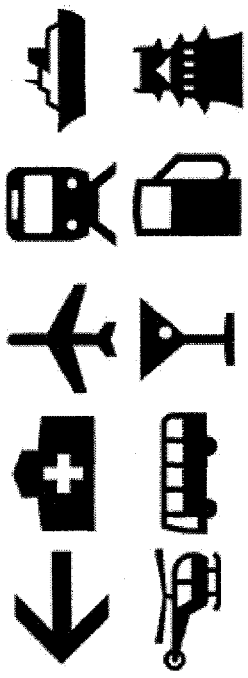
FIG. 14 is an explanatory view illustrating one example of a font and a pictogram used in an experiment according to the present invention.

In order to confirm the effectiveness of the method in the embodiment 2 using the recognition method of separated characters, (62) figures and (62) alphabets in four fonts, which were Arial, Century, Gigi, and Impact illustrated in FIG. 14, were recognized. Since some characters are difficult to distinguish under affine distortions as described in Section 3, the characters in a cell in Table 3 were treated as the same class in all experiments. In the recognition process described in Section 4.2, if the highest vote was 0, the connected component was rejected.

Figure 15:
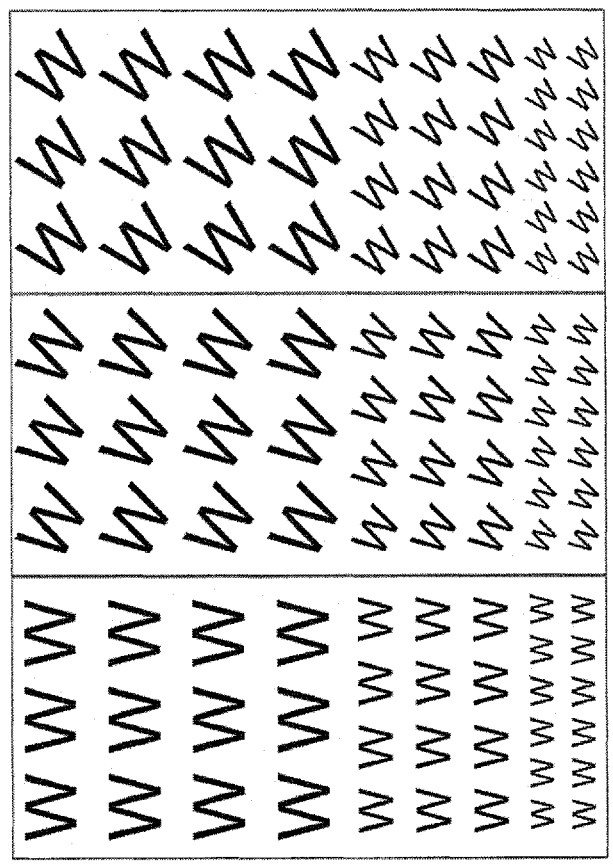
FIG. 15 is an explanatory view illustrating one example of a paper of a recognition target used in experimental examples 1 and 2 according to the present invention.

A test pattern illustrated in FIG. 15 was prepared as a recognition target. The test pattern includes characters in nine conditions which were the combinations of three different sizes (72 pt, 48 pt, 32 pt) and three different rotation angles (0, 30, and 45 deg.). The test pattern includes 12 characters for each condition, so that the test pattern contains 108 characters in total. 62 test patterns were prepared for 62 characters. Each of the printed test patterns was captured in three different angles (0, 30, and 45 deg.) by a digital camera. The average size of "A" of 72 pt in Arial captured from front (in 0 degree) was 40.7×44.8 pixels, and the average size of "A" of 32 pt in Arial captured in 45 degrees was 10.0×18.6 pixels. In the experiment, only the fonts that were the recognition target were stored as the reference images. A parameter S described in Section 4.2.3 was 20. The hash size was set to $H_{size}=2^{19}-1$.

Firstly, the average processing time per character is illustrated in Table 5. Since the processing time needed for one character was about 4 ms, the recognition rate turned out to be around 200 to 250 characters per second by a simple calculation.

TABLE 5

Average processing time for recognition of a letter (pictogram). Picto represents pictograms

| | Font | | | | |
|---|---|---|---|---|---|
| | Arial | Century | Gigi | Impact | Picto |
| Proc. Time (ms) | 3.9 | 3.6 | 3.7 | 5.2 | 4.2 |

Figure 19:
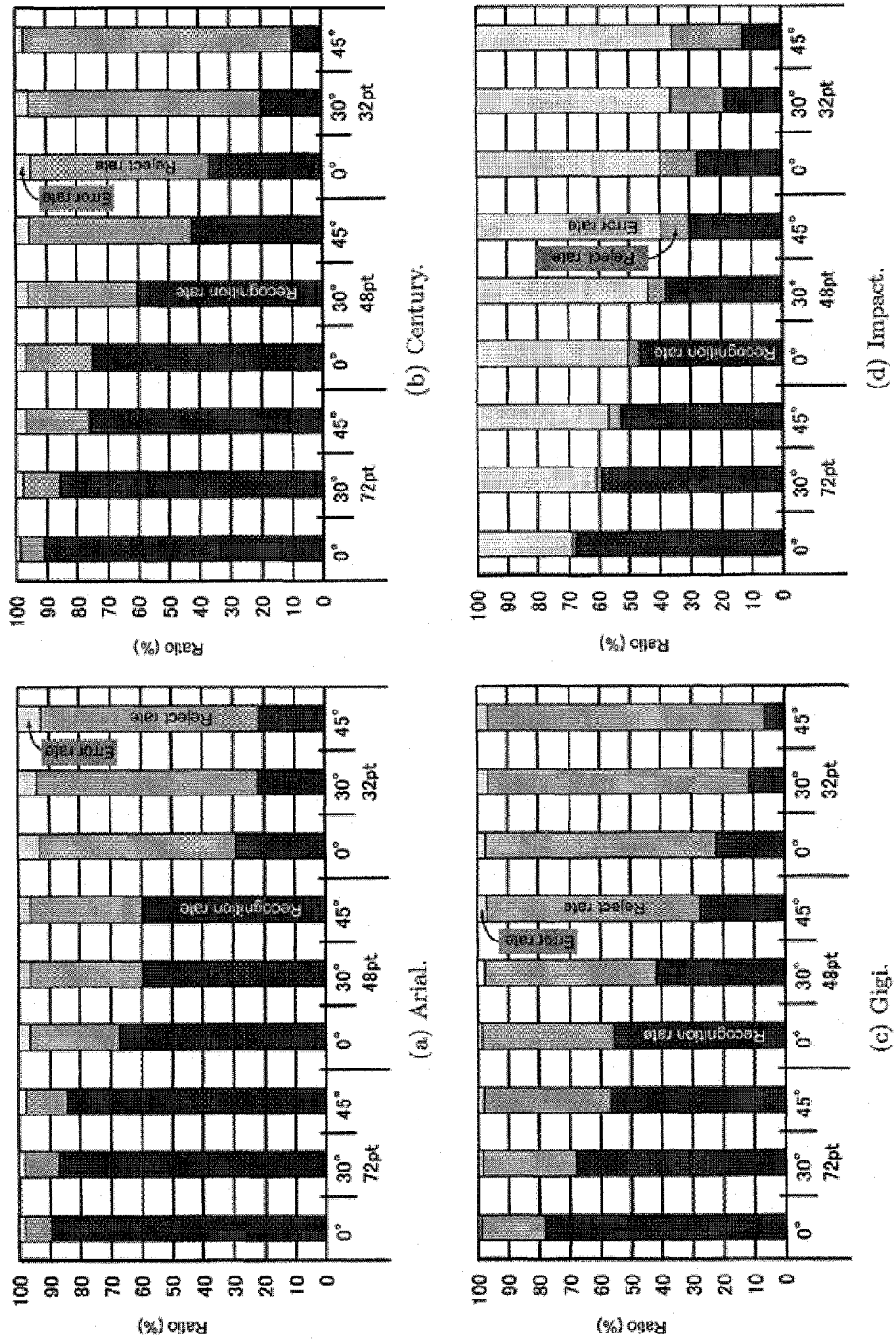
FIG. 19 is a graph illustrating a first result of the experimental example 2 according to the present invention, wherein recognition rates, rejection rates, and error rates for fonts of plural types are illustrated.

Secondly, the recognition results are shown in FIG. 19. FIG. 19 shows that recognition rates decreased as the size of characters decreased or as the angle of capture increased, and the decrease in the recognition rate was caused by the decrease in the character size rather than the change in the angle of capture. The detail of the recognition results will be discussed below.

For the fonts other than Impact, as recognition rates decreased, rejection rates increased by that much, and error rates did not increased so much. This was caused because the quantized parameter D of the feature vector was large. More specifically, as D was large, the hash index to be calculated changed by a slight fluctuation of an image, whereby the reliable temporary results could not be acquired. When D was changed to 2 from 3, the lowest recognition rate of Arial, in the case of 32 pt and 45 degrees, the recognition rate increased from 21.54% to 52.73%. However, the error rate also increased from 7.57% to 36.31%. It is up to applications which should be chosen. It is generally considered that the lower error rates are significant characteristic, so that D=3 was employed in the present embodiment.

For Impact, as recognition rates decreased, error rates increased by that much, and rejection rates did not increase so much. The cause was that, since the characters in Impact have thick lines, the feature vectors in any connected components got similar, and discrimination ability decreased. The average processing time in Table 5 shows that Impact required more time, compared to the other fonts. This implies that many hash collisions occur due to low discrimination ability of the feature vectors. This can be improved by introducing existing normalization methods and features.

6.2 Performance Evaluation for Pictograms

Figure 20:
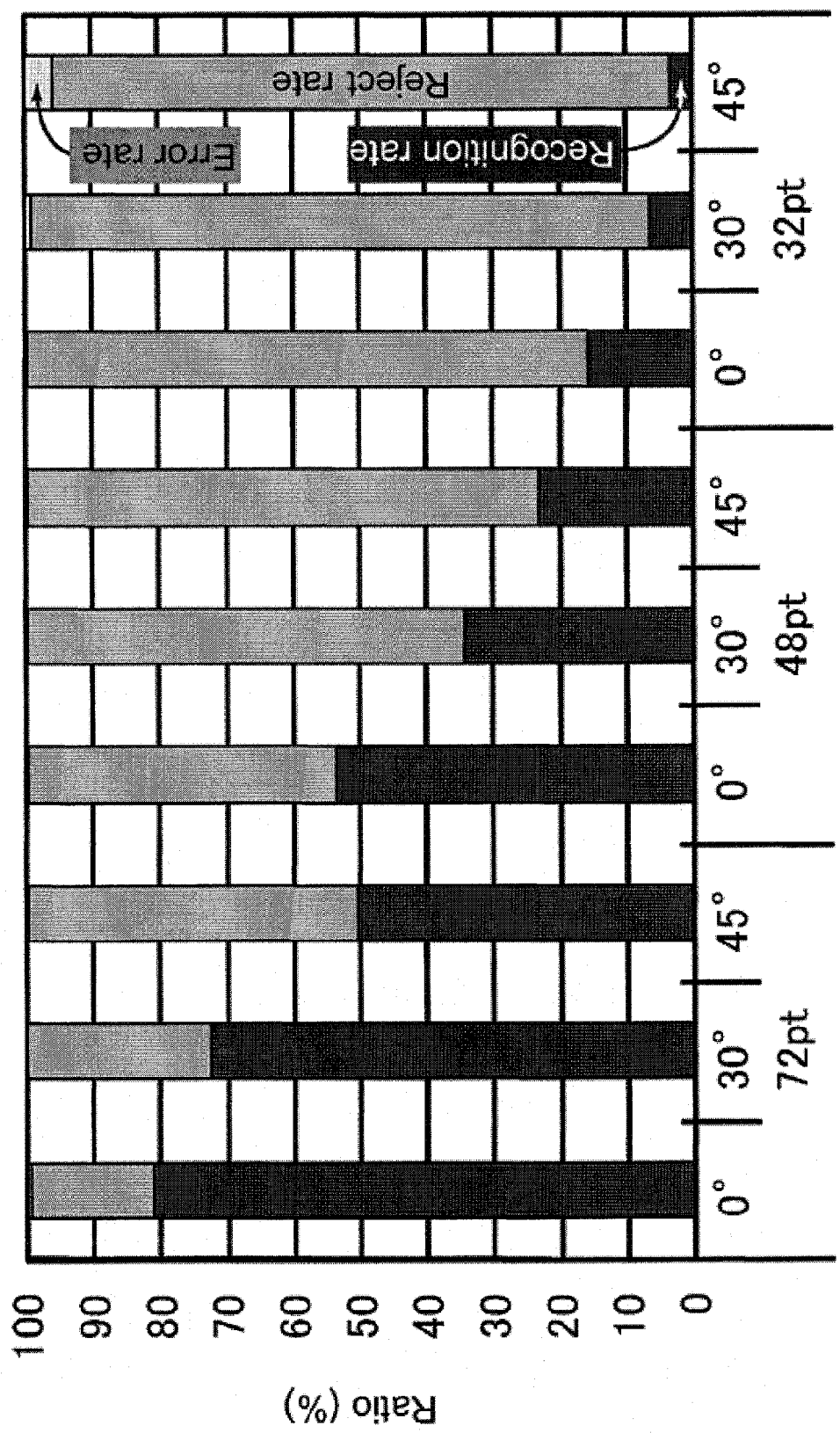
FIG. 20 is a graph illustrating a second result of the experimental example 2 according to the present invention, wherein recognition rates, rejection rates, and error rates for the pictograms in FIG. 14 are illustrated.

Finally, in order to investigate recognition ability to figures other than characters, not only 4 fonts described above but also 10 pictograms illustrated in FIG. 14(b) were also recognized in the same manner. As illustrated in FIG. 20 and Table 5, the recognition results were similar to the fonts other than Impact.

From the above, it can be confirmed that the present invention worked fast and achieved low error rates except a part of fonts.

Figure 21:
FIG. 21 is an explanatory view illustrating one example of an image that is a recognition target of the experimental example 2 according to the present invention.

6.3 Performance Evaluation for Text in FIG. 21

A text illustrated in FIG. 21 was recognized. The text was captured with the digital camera being tilted at an angle of 0, 30, and 45 degrees with respect to the paper, and only the paper portion was extracted in order that the background was not present. The sizes of the extracted images at an angle of 0, 30, and 45 degrees were 2470×1746, 2278×1746 and 2038×1844, respectively. The acquired images were illustrated in FIG. 22. The text in FIG. 21 contains 236 characters (except for commas): 168 in Arial, 27 in Arial Black Italic, and 41 around MIRU logotype (in unknown fonts). The characters were recognized after storing Arial and the unknown fonts.

Processing time and recognition results in S=200 and S=20 are illustrated in Table 6. Most errors were caused by misrecognition of "i" (confusion of "i", "I", and "l"), confusion of "U", "u", and "n", and that of "E" and "m". From the comparison of S=200 and S=20, the case of S=200 achieved higher recognition rates than in the case of S=20, but S=20 was about 6 times faster than S=200. Thus, it can be confirmed that fast recognition is possible when S is small, and a more robust recognition can be realized, when S is increased, according to need, although the processing time slightly increases.

TABLE 6

Recognition rates and whole processing time for text in FIG. 1

| | S | | | | | |
|---|---|---|---|---|---|---|
| | 200 | | | 20 | | |
| | Angle (deg.) | | | | | |
| | 0 | 30 | 45 | 0 | 30 | 45 |
| Time (ms) | 7990 | 7990 | 7020 | 1300 | 1260 | 1140 |
| Rec. rate (%) | 94.9 | 90.7 | 86.4 | 86.9 | 81.8 | 76.3 |
| Rej. Rate (%) | 0.4 | 3.0 | 6.4 | 6.4 | 9.3 | 16.5 |
| Error Rate (%) | 4.7 | 6.4 | 7.2 | 6.8 | 8.9 | 7.2 |

7. Related Research

The related researches of the present invention, other than the geometric hashing, will be described below.

There is a method of LLAH (Locally Likely Arrangement Hashing) proposed by Nakai et al. (see Tomohiro Nakai, Koichi Kise, and Masakazu Iwamura, "Fast Camera-Based Document Image Retrieval Using Local Arrangements of Feature Points", IEICE trans. D, vol. J89-D, no. 9, pp. 2045-2054, September 2006, or Pamphlet of International Publication No. WO2006/092957). This method focuses on a local arrangement of a feature point acquired by a simple image process, wherein the corresponding feature point is retrieved with high speed from a database with the use of a geometric invariant and a hash. Comparing the LLAH with the geometric hashing, in the LLAH, the computational cost and the memory amount to be used are reduced to a fraction of several hundred million of those in the conventional method, wherein the robustness of the retrieval is maintained. The factors that can enhance the performance include the reduction in the computational cost due to the limited selecting method of the feature point and the enhancement in the discriminating ability due to a creation of high-order feature vectors.

The former factor is similar to the concept of the present invention, but this concept cannot be applied to the case where the feature points are continuous as in the present invention, since the LLAH assumes discrete feature points. The latter factor can be applied to the present invention, and further enhancement in the performance of the present invention can be expected. In order to describe this method, how the LLAH creates a high-order feature vector will firstly be described. Supposing the affine transformation as one example, one invariant can be calculated, if four points are present on the same plane. In the LLAH,

[Equation 11]

$$\binom{m}{4}$$

invariants, each of which corresponds to four points being selected from m>4 points, are calculated, and

[Equation 12]

$$\binom{m}{4}$$

order vectors are generated to create a high-order feature vector, whereby the discriminating ability is enhanced. The process same as that in the LLAH can be carried out in this invention. Specifically, in the affine transformation, many points exceeding three are obtained, and many feature vectors are calculated. All of them are combined to form a high-order vector. Thus, a feature vector having higher discriminating ability can be calculated. Since the feature point that is to be additionally determined can uniquely be selected, the increase in the computational cost is considered to be a little.

There is another method in which the method of selecting the feature is limited so as to reduce the computational cost, as in this invention and LLAH. In the method proposed by Rothwell et al, connected five line segments or two conic curves are extracted so as to calculate the invariant of the perspective transformation (see C. A. Rothwell, A. Zisserman, D. A. Forsyth and J. L. Mundy, "Using projective invariants for constant time library indexing in model based vision," Proc. British Machine Vision Conference, 1991.). Since the extracted line segments are adjacent to each other, they can easily be ordered, and since the combination of the orders for calculating the invariant is limited, the process can be made with high speed. However, a line segment or conic cannot always be extracted from a figure having an optional shape, which is the subject of this invention, so that this method is difficult to be applied.

If the target is limited to the figure that undergoes the affine transformation, there is a method in which the figure that undergoes the affine transformation is compared after it is normalized. Leu et al. proposes a method in which a covariance matrix is obtained from a coordinate of a pixel forming the figure, and the figure is normalized by scaling, and shear with the use of the inverse matrix of the obtained matrix (see J.-G. Leu, "Shape normalization through compacting," Pattern Recognition Letters, vol. 10, no. 4, pp. 243-250, 1989.). However, in this method, a matching considering the rotation of the figure is needed with some methods, since there remains an arbitrary property in the rotation. To this problem, Horimatsu et al. discusses a method of increasing a speed in the matching in the rotation direction. However, it is hard to say that the high speed is sufficiently achieved (see A. Horimatsu, R. Niwa, M. Iwamura, K. Kise, S. Uchida and S. Omachi, "Affine invariant recognition of characters by progressive pruning," Proceedings of the 8$^{th}$ IAPR International Workshop on Document Analysis Systems (DAS2008), pp. 237-244, September 2008.).

To this problem, if the affine transformation according to the present invention is used, or the present invention is used in a similar transformation level, the matching is possible with the computational cost of $O(P^2)$ in both cases. In the similar transformation, the computational cost for creating a similar invariant coordinate system is $O(P)$, and the computational cost for projecting the feature point is $O(P)$. In the specific method of the similar transformation, the first and the second points are obtained in the same manner as in the affine transformation. The considered method of obtaining the third point includes a method of determining the third point with a predetermined angle since the angle is stored in the similar transformation, and a method of determining the third point to have a predetermined distance from the first and second points, since the length is stored.

Various modifications are possible in the present invention, in addition to the above-mentioned embodiments. These modifications should not be considered as not belonging to the scope of the present invention. The present invention should include the equivalents of the claims and all modifications within the scope of the invention.

8. Modification

In this section, an improved method is proposed by introducing three measures, described in the Non-Patent Document 7, to the embodiments described in the previous section.

8.1 Modification

The first measure is a distance calculation. As described in Section 4.2.5, the information acquired from the hash table contains errors. The correct one should be selected from the information described above. In the embodiment illustrated in FIG. 13(a), reliable information with respect to fonts is extracted by the voting method. On the contrary, in the present embodiment, Euclidean distance between the query feature vector and the feature vector acquired from the hash table is calculated, and the feature vectors having smaller distance than a threshold are selected, instead of the method described above.

In the method described in the Non-Patent Document 7, only the feature vector having the smallest distance is selected, which is slightly different from the present embodiment. In the preliminary experiment where both methods are compared, the performance in the method in the present embodiment using the threshold is better. The threshold is determined, depending upon a horizontal to vertical ratio of a connected component. Specifically, when a ratio of a long side and a short side of a circumscribed rectangle of the connected component is defined as r:1, and t is defined as a constant, the threshold is determined to be tr. This is determined in consideration of an error of the feature vector generated by the image process.

Figure 3:
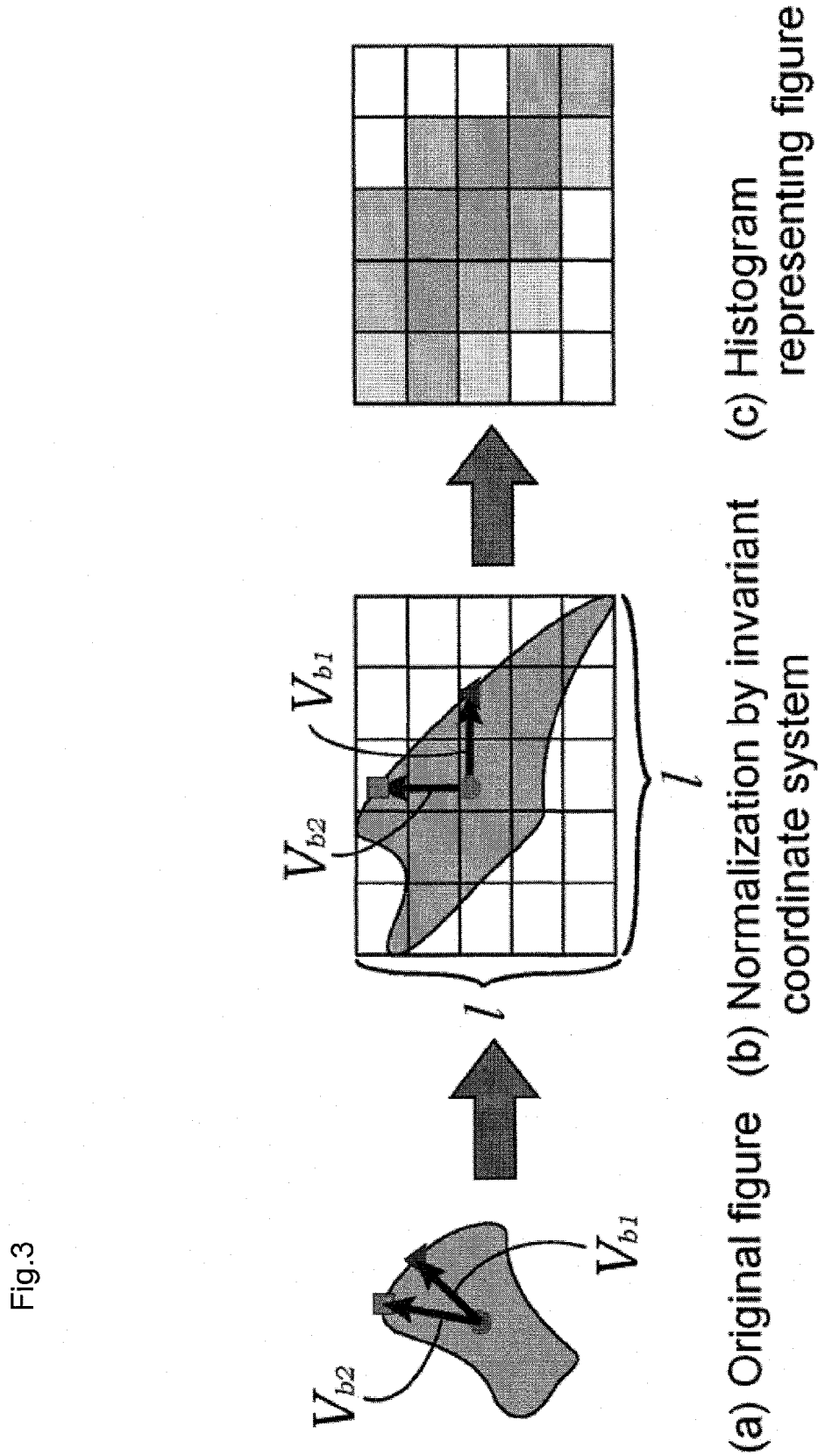
FIG. 3 is a second explanatory view illustrating a method of determining an invariant coordinate system in a known geometric hashing.

In the normalization of an image for calculating the feature vector illustrated in FIG. 3(b), if the image before the normalization is long and thin, the image is subject to a great deformation (for enlarging pixels) upon the normalization, whereby the pixel values are changed, which generates an error in the feature vector. Therefore, there was a tendency in which the above-mentioned distance increased. In order to cope with this problem, the threshold was set depending upon the horizontal to vertical ratio of the connected component. In this embodiment, t=0.08 was used during the storage, and t=0.032 was used for the recognition. One of the causes for the difference in the threshold between the storage and the recognition is the difference in the size of the connected components in the normalization, which is described in the next section. This measure is very strong, and it is confirmed that, when 100 fonts are stored in the database, the recognition rate increases by about 7%, and the processing time is decreased by the maximum of 10 ms, regardless of the capture angle.

Figure 23:
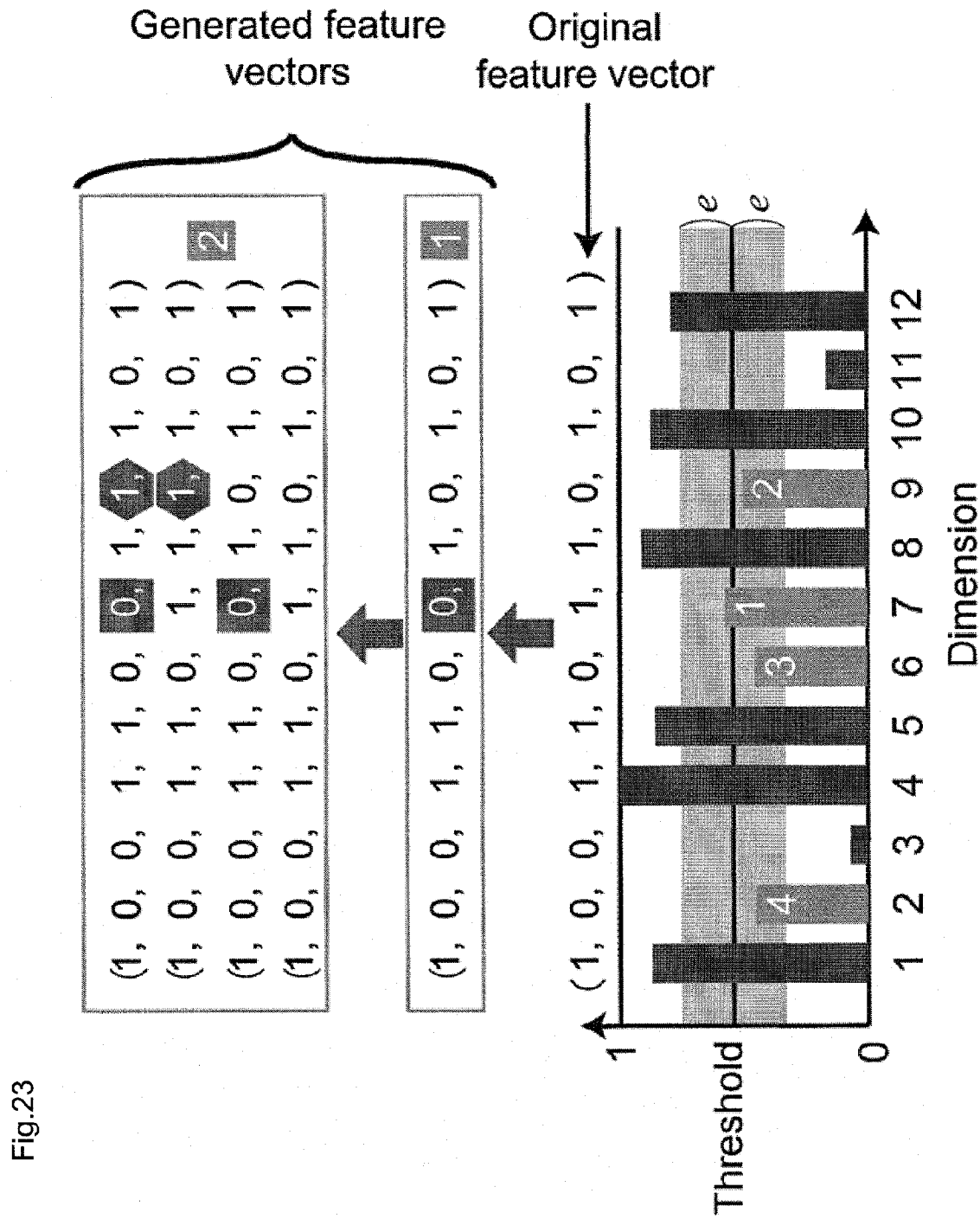
FIG. 23 is an explanatory view illustrating that a new query feature vector is created by a bit invert of the query feature vector.

In the second measure, a new query feature vector is created by a bit invert of the query feature vector as illustrated in FIG. 23. It is confirmed from a preliminary experiment that, if the first and second measures are simultaneously used, the recognition rate increased by about 7% regardless of the capture angle, and the processing time decreased by about 0.3 to 4.0% depending upon the capture angle. In the present embodiment, e=0.002 and b=8 were used for 48-dimensional feature vector.

The third measure relates to a collision of a hash value. In the experimental example 2, there were a large amount of collisions caused in some bins of the hash table. The hash processing time is in proportion to the number of the collisions. Therefore, when a large number of collisions occur, the processing time might be extremely reduced. In this modification, in the bins having the number of collisions exceeding c, the elements therein are thinned out to be c. Specifically, in the bins where a large number of collisions occur, the excessive elements are deleted in order to leave only c elements. With this process, the memory amount and the processing time can remarkably be reduced.

In the method described in the Non-Patent Document 7, when the collisions more than the threshold occur, all information pieces stored in the corresponding bins are deleted, which is slightly different from the method in the present invention. When the method in the Non-Patent Document 7 was carried out as it was, only a circular character such as "O" cannot selectively be recognized. The considered cause of this is that almost all the feature vectors are stored in the same bin for the circular character, and if the information in this bin is all deleted due to the large amount of collisions, this character cannot be recognized at all.

It is confirmed by the preliminary experiment that, when this measure is merely carried out, the recognition rate decreased by about 12 to 17% depending upon the capture angle, and the processing time was 3 times faster regardless of the capture angle. In the embodiment, c=20 was used.

8.2 EXPERIMENTAL EXAMPLE 3

In order to confirm the effectiveness of the above-mentioned embodiment, a database storing the maximum of 100 fonts was prepared, and character images of various fonts captured by a camera were recognized.

8.2.1 Preparation of Experiment 62 characters including capital alphabets, lowercase alphabets, and numerals in total were used for the experiment. In order to create 8 types of degraded images for one reference image, 55800 reference images in total were registered in the database with 100 fonts. Recognition targets illustrated in FIG. 24 were prepared to contain each character twice (124 characters in total) in the same layout, in which characters are arranged on a curved line, for all fonts. They were printed on an A4 paper and captured with a digital camera in an angle of 0, 30, and 45 degrees, and the images extracted manually were specified as the recognition targets. FIG. 24 illustrates the images of the recognition target of Century. The sizes of the images were 1549×2197, 1397×2185 and 1265×2201.

100 fonts were selected from the ones installed to Microsoft Windows 7 (registered trademark). Upon the selection, the fonts having thin strokes were excluded, since the connected component is liable to be decomposed into two or more components due to the effect of the deterioration in the resolution. 10 fonts out of the selected fonts are illustrated in FIG. 25.

In the experiment, the number of fonts stored in the database was gradually increased from 1 to 100, and recognition rates and processing time were observed. The number of the registered fonts was increased by one font from 1 to 10 fonts, and after the eleventh fonts, increased by 5 fonts. Since only recognition targets for 75 fonts were prepared, the method of the experiment is slightly different for the recognition targets having the registered fonts of 1 to 75, and for the recognition targets having the registered fonts of 80 to 100. Up to 75 fonts, the recognition targets having the fonts same as the registered fonts were recognized. Specifically, when the number of the fonts was one, only Arial font was stored in the database, and the character image of Arial font was used as the recognition target. When the number increased to two, Arial and Century fonts were registered, and the character images of Arial and Century were recognized. When the number of fonts was larger than 80, the recognition targets of all of 75 fonts were recognized, regardless of the number of the registered fonts.

The connected components were automatically grouped during the storage process. The number of the connected components constituting the character is checked during the storage process, because the separated character is handled. If there are two or more connected components, the relationship between the relative position and size of two connected components is described in the separated character table illustrated in FIG. 10. During the recognition process, the separated character table is referred to, and if there are the connected components satisfying this condition, the connected components are combined, and recognized as one character.

Figure 26:
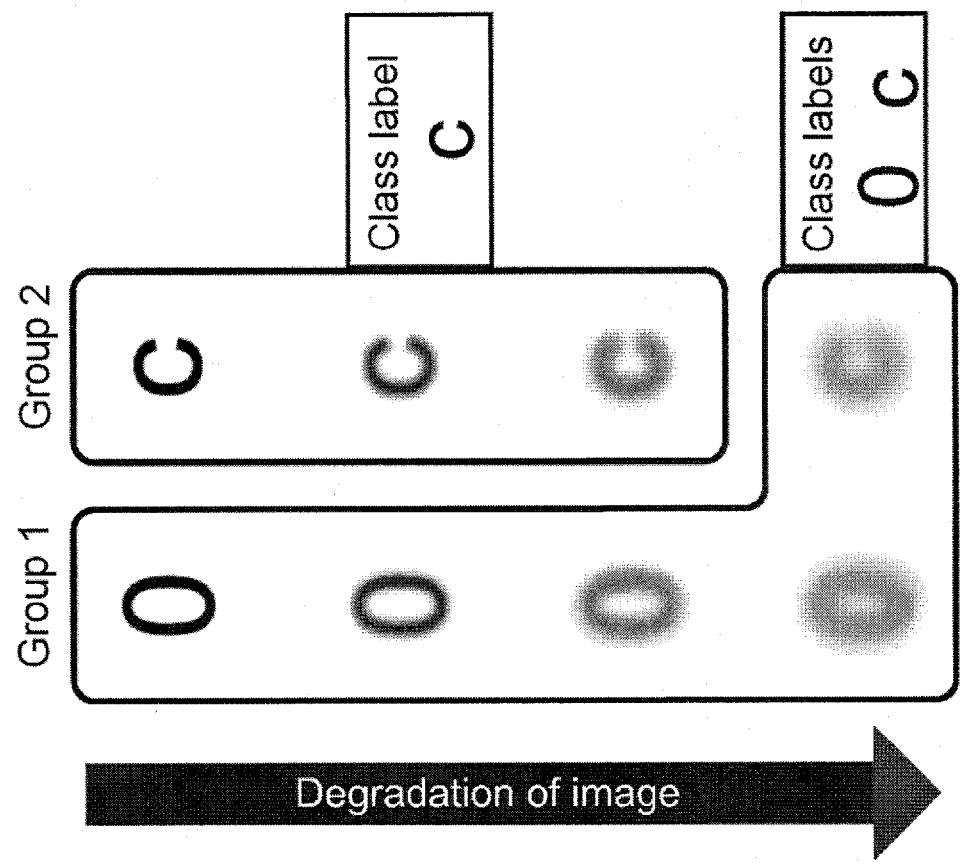
FIG. 26 is an explanatory view illustrating an example a grouping process of connected components in experimental examples 3 and 4 according to the present invention.

In the case of Arial font, the bottom connected component of "i" has the same shape of "I (capital ai)" and "l (lowercase el)", when it undergoes the affine transformation, and they are indistinguishable. Thus, in order to recognize "i" correctly, all connected components of the same shape such as "I" and "l" must be checked whether it is a part of "i" or not. In order to realize the process, all connected components that have the same shape due to the affine transformation are grouped. That is, during the storage process of the reference image, each reference connected component is checked one by one, by using the database that is currently being created, and if the connected components in the same or quite similar shape are already stored, it is assigned to the same group. Attention should be paid that there may be the case in which the connected components of different characters might be assigned to the same group due to the grouping process. In the example illustrated in FIG. 26, the degraded "c" belongs to a group 1 that is the same group for "0", so that it cannot be determined whether the connected component that is recognized as the group 1 during the recognition process is "0" or "c". The discrimination of the characters in the same group is made in a word recognition process described later.

In the grouping process, the second measure described in the present embodiment, which is the measure of creating a new query feature vector by the bit invert of the query feature vector, was not employed. As an example of grouping, Table 7 illustrates the result of the grouping of 62 characters in Arial font.

TABLE 7

| 0Oo | 69 | 7L | Cc | Em | Il | NZz |
|-----|----|----|----|----|----|-----|
| Ss  | Vv | Ww | bq | dp | nu |     |

Table 7 illustrates only the group to which two or more characters belong, in 55 groups.

In the experiment, a computer having a CPU of Opteron 2.8 GHz and a memory of 32 GB was used. In order to reduce the computational cost needed for the storage and recognition of images, the extracted image was normalized so that the largest size of the width and height of the connected component was 100 pixels in the reference image, and 50 pixels in the query image. The parameters not described in the present experimental example (Section 8) were set such that I=4 (i.e., k=16), $H_{size}=2^{19}-1$, D=2, and S=10. Since these parameters were also used in the experimental example 2 described later, the result of this example is not totally equal to the result described in the previous section, although the same method is employed.

8.2.2 Result of Experiment

Figure 27:
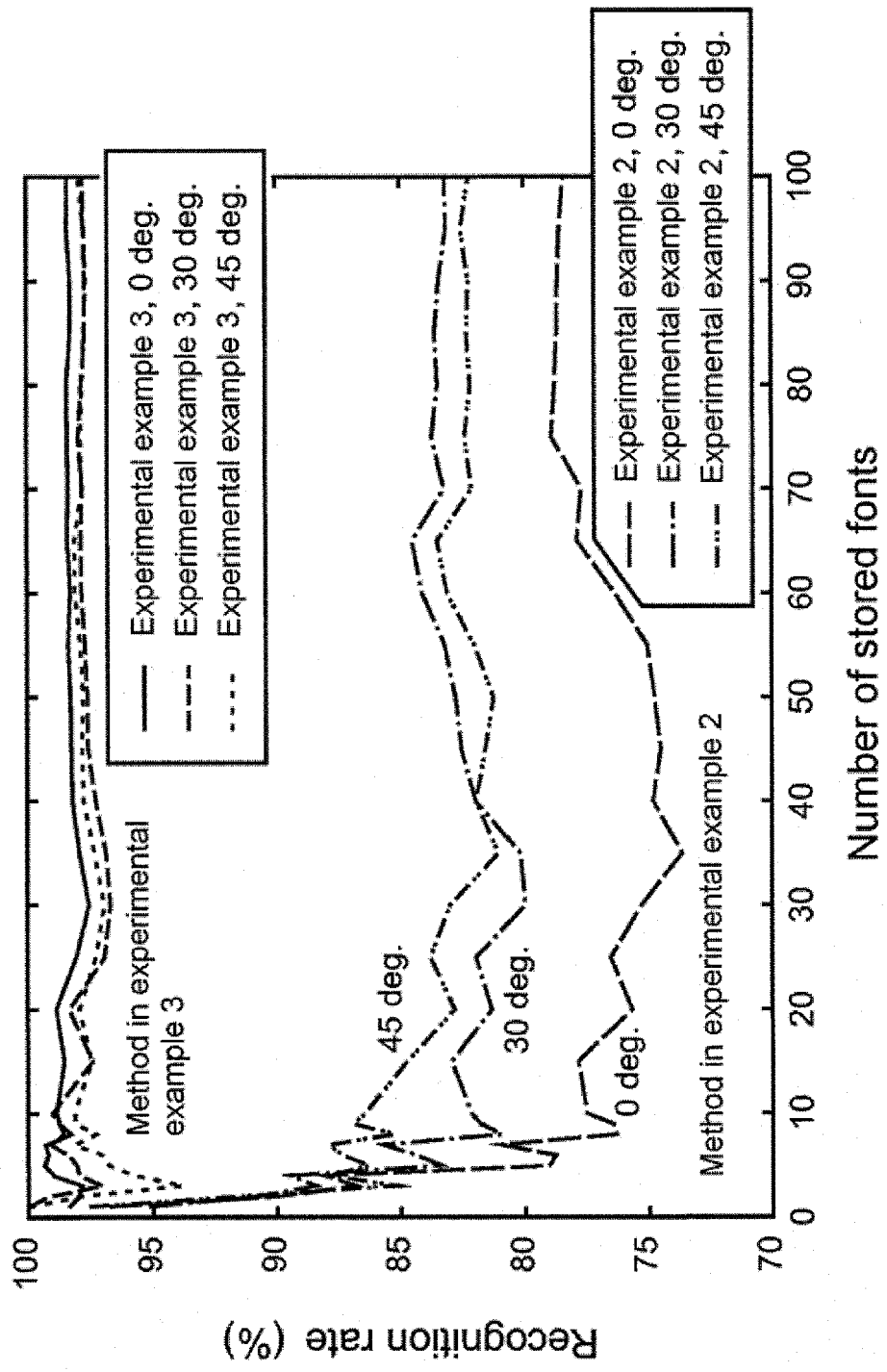
FIG. 27 is a graph illustrating recognition rates for a number of registered fonts in the experimental example 3 according to the present invention.
Figure 28:
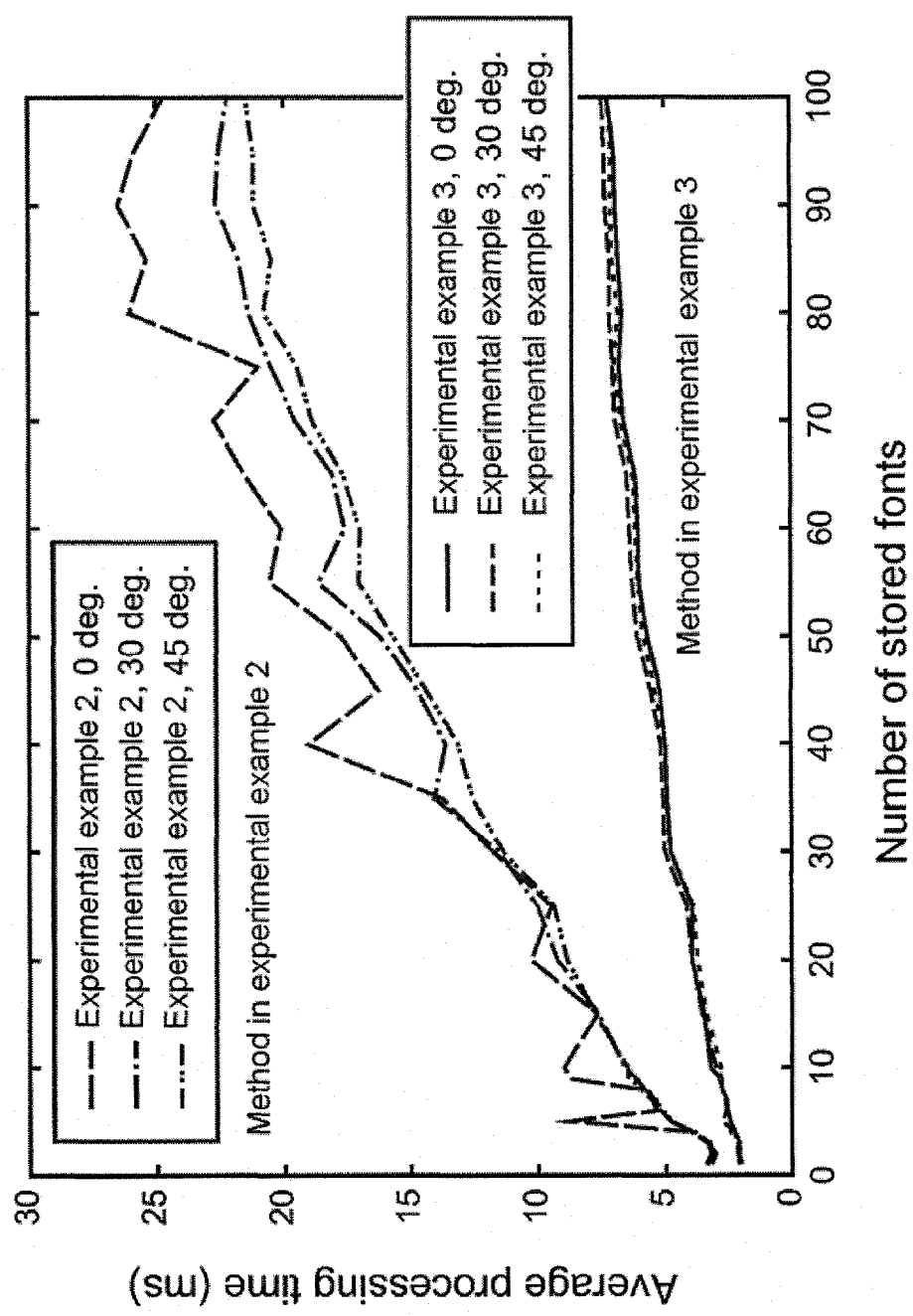
FIG. 28 is a graph illustrating an average processing time per character in the experimental example 3 according to the present invention.

FIGS. 27 and 28 illustrate a recognition rates and average processing time per character. The "Experimental Example 2" in the figure indicates the method used in the experimental example 2. When plural fonts were registered in the method in the experimental example 2, the recognition rate reduced, while the recognition rate in the proposed method was almost constant at high level regardless of the number of the registered fonts. The processing time increased in both the method in the experimental example 3 (the present embodiment) and in the method in the experimental example 2 with the increase in the number of the registered fonts, wherein the slope of the increase is gentle in the proposed method.

The recognition results in the present embodiment represented by specific numerical values were checked. The recognition rate for images captured from the right angle was 98.4% (the increase by 20.0% from the rate in the experimental example 2), and the recognition rate for images captured from 45 degrees was 97.9% (the increase by 15.7% from the rate in the experimental example 2). The processing time was 7.2 ms (3 times faster than that in the experimental example 2), which means about 140 characters can be recognized in one second. Accordingly, it is confirmed that three measures introduced by the present embodiment are very effective.

Figure 29:
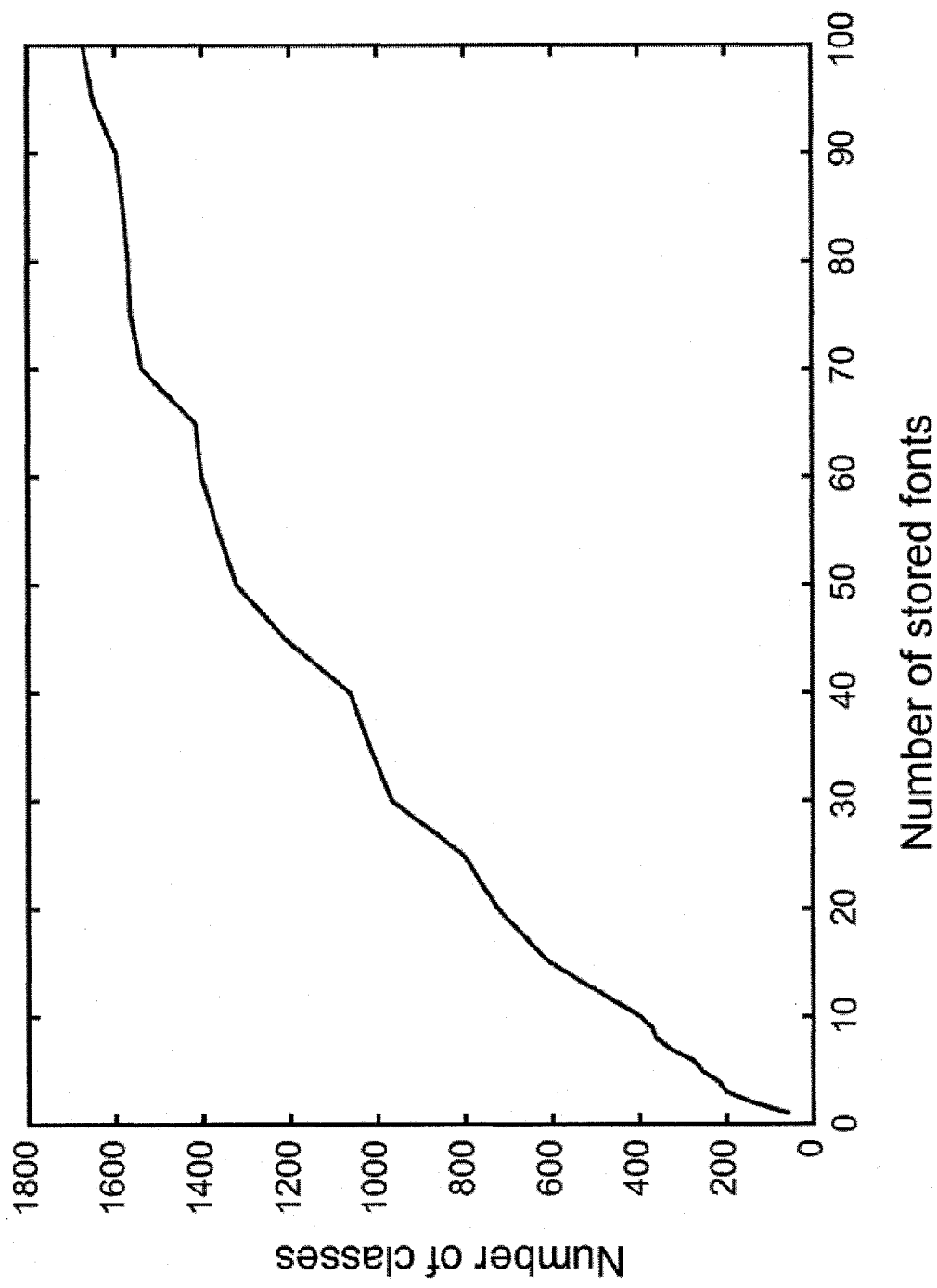
FIG. 29 is a graph illustrating a number of groups for a number of registered fonts in the experimental example 3 according to the present invention.
Figure 30:
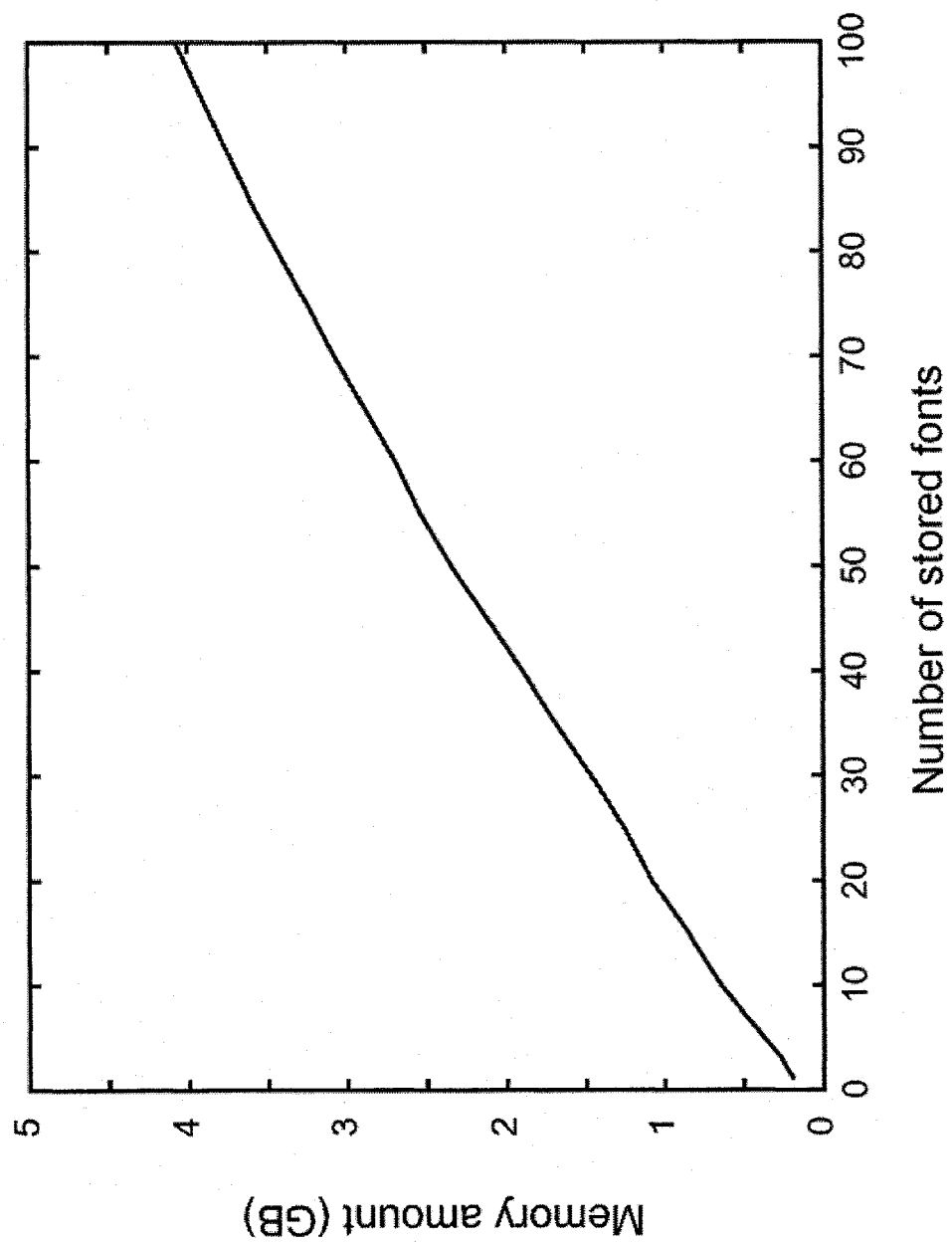
FIG. 30 is a graph illustrating a memory amount for a number of registered fonts in the experimental example 3 according to the present invention.

FIGS. 29 and 30 illustrate the number of groups and a memory amount in the present invention. There were 55 groups for the number of registered fonts of 1, 397 groups for 10, and 1672 groups for 100. The number of groups flatly increased as the number of registered fonts increased, but the rate of increase was gradually reduced. This is considered that some of the fonts newly registered were assigned to the group same as the group of the reference image that has already been stored. On the other hand, the memory amount increased substantially proportional to the number of registered fonts. This is because the information stored in the hash table was hardly changed, regardless of the increase in the number of groups. For 100 fonts, the memory amount was about 4 GB, and it is considered that the memory amount can remarkably be reduced depending upon the mounting design.

9. Word Recognition

The above-mentioned embodiments perform the recognition one character by one character. Therefore, we can know which character is written in which part of a text, but we cannot know what meanings of words and sentences written are in the text. Considering that many of keywords for information search are words, the word recognition is indispensable.

According to the present embodiment, a word recognition is carried out to cope with a word that is identified from the other words with a space formed between the words, such as English, and that is according to a rule of a predetermined reading direction, e.g., a rule that the words are written from left to right. The prerequisites are such that an independent scaling and shear distortion are removed from a text image during the character recognition.

9.1 Outline of Apparatus with Word Recognition Function

In the present embodiment, a pattern recognition apparatus (hereinafter referred to as a demonstration system) with a word recognition function, which is created by the present inventors for verifying the realization and effectiveness of an information acquiring application utilizing the real-time character/word recognition technique, will be described.

There are characters anywhere in environment, such as in an article in a magazine, or on a signboard on a street, and they send information having a certain meaning such as a route to a destination or advertisement of goods. If the characters in the environment are captured by a camera, and a real-time recognition is executed by a computer, various services are expected. A pattern recognition apparatus using characters in scene does not need a special preparation, so that it can advantageously be used easily. Since words in real world link to various services, we call the function of the pattern recognition apparatus "use character strings in environment as link anchor".

Figure 31:
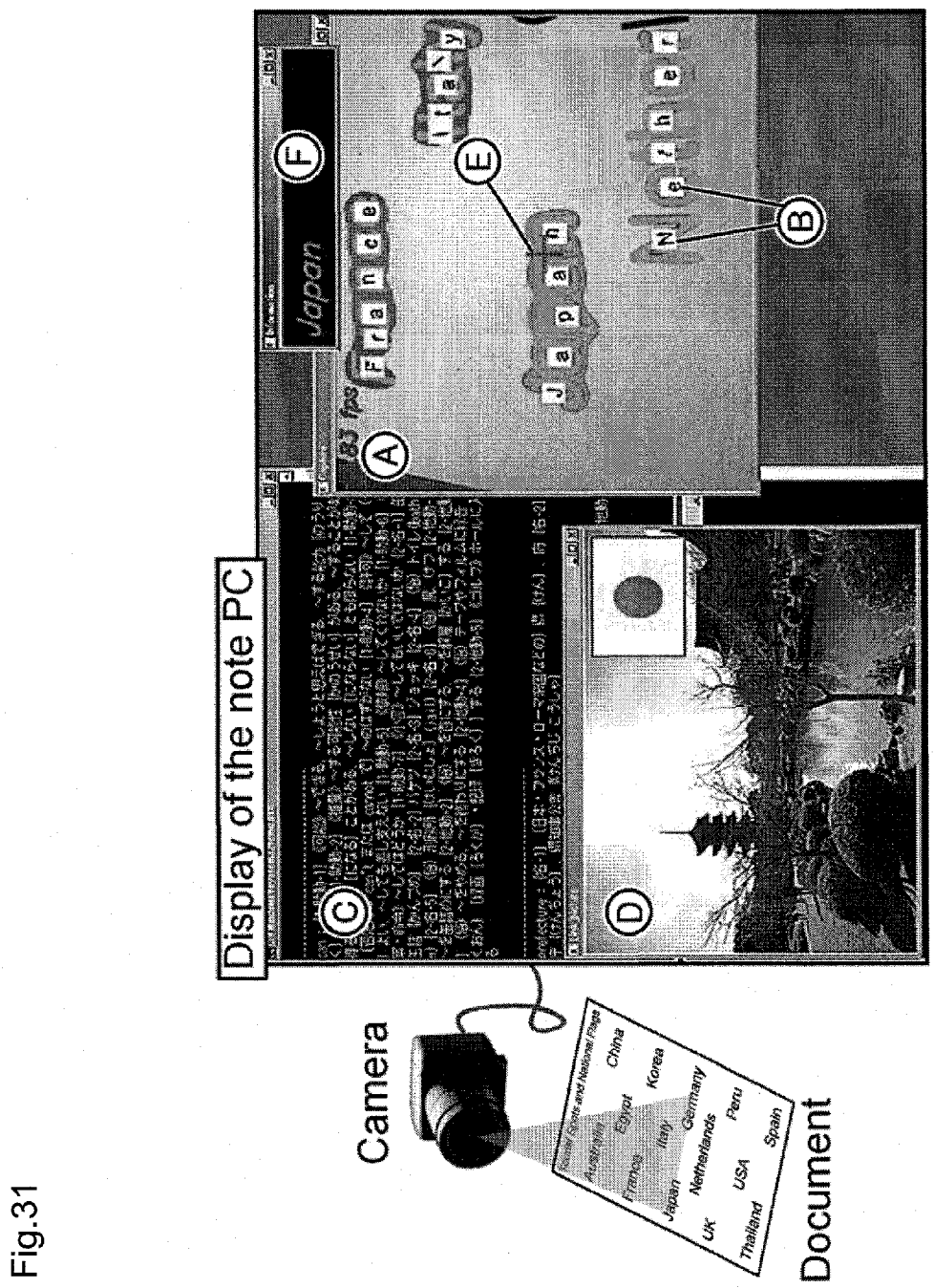
FIG. 31 is an explanatory view illustrating an outline of a demonstration system used in an experimental example 4 according to the present invention.

The outline of the demonstration system will be described. FIG. 31 illustrates the outline of the demonstration system. The demonstration system is operated with a commercially available notebook personal computer and a compact camera, and it can be used in a portable manner. A target text includes black characters printed on a white paper, wherein the layout is optional. When the camera captures the paper, processes and outputs described below are made every frame in a real-time manner. Firstly, a character region is extracted from the captured image (encircled A in FIG. 31, the same is applied below), whereby characters are recognized. The extracted character region is displayed with green on a screen, and the recognition result is superimposed on the center of the region one character by one character (B in FIG. 31). Since the character recognition is robust to the projective distortion, the characters captured obliquely can be recognized, wherein the parameters of the character distortion caused during the capture are estimated during the character recognition, and the distortion can be reflected on the resultant image. For example, a resultant image that becomes thin with the same degree is superimposed on a character that is captured as being thinner and longer than in the case where the same character is captured from a right angle. Then, a word region is extracted according to the present invention, whereby words contained in the captured image are acquired. The word region is displayed with purple on the screen. The words obtained with this process are the keyword for the information search, i.e., "link anchor", and we can make an access to linking various information.

The demonstration system has mounted thereto three services, such as translation, image display, and voice navigation, as examples of services to a user. According to the translation function, an English word is transmitted to an English dictionary server, and the translated word is displayed on a console (C in FIG. 31). On the image display, a national flag and an image of tourist's spot are linked to the word of the country name, and an image window (D in FIG. 31) is opened when the user captures the scene with the camera. Similarly, in the voice navigation, a sound of an animal is linked to a word of the animal.

A different link can be made even to the same word because of the difference in fonts. In this demonstration system, when a word of an animal is captured, a photograph is presented, instead of a sound of the animal, only in the case of Arial. Considered examples of an application of a service by fonts include a function of letting a user to know when there is an emphasized character.

The information of all link anchors contained in the captured screen can be presented, but this is inconvenient since a user has to receive random information, as the case may be. In view of this, in the demonstration system, a mode by which an optional word can be selected is prepared in order for the user to take out only useful information. Since a cursor is displayed (E in FIG. 31) at the center of the captured screen, the user puts the cursor on an optional word region for selection. The selected word region is emphasized in color, or the character string of the region is displayed on another window (F in FIG. 31). The user can click the region to make an access to a service, or an automatic access can be made when the cursor is put on the word.

9.2 Outline of Character Recognition Method

Figure 32:
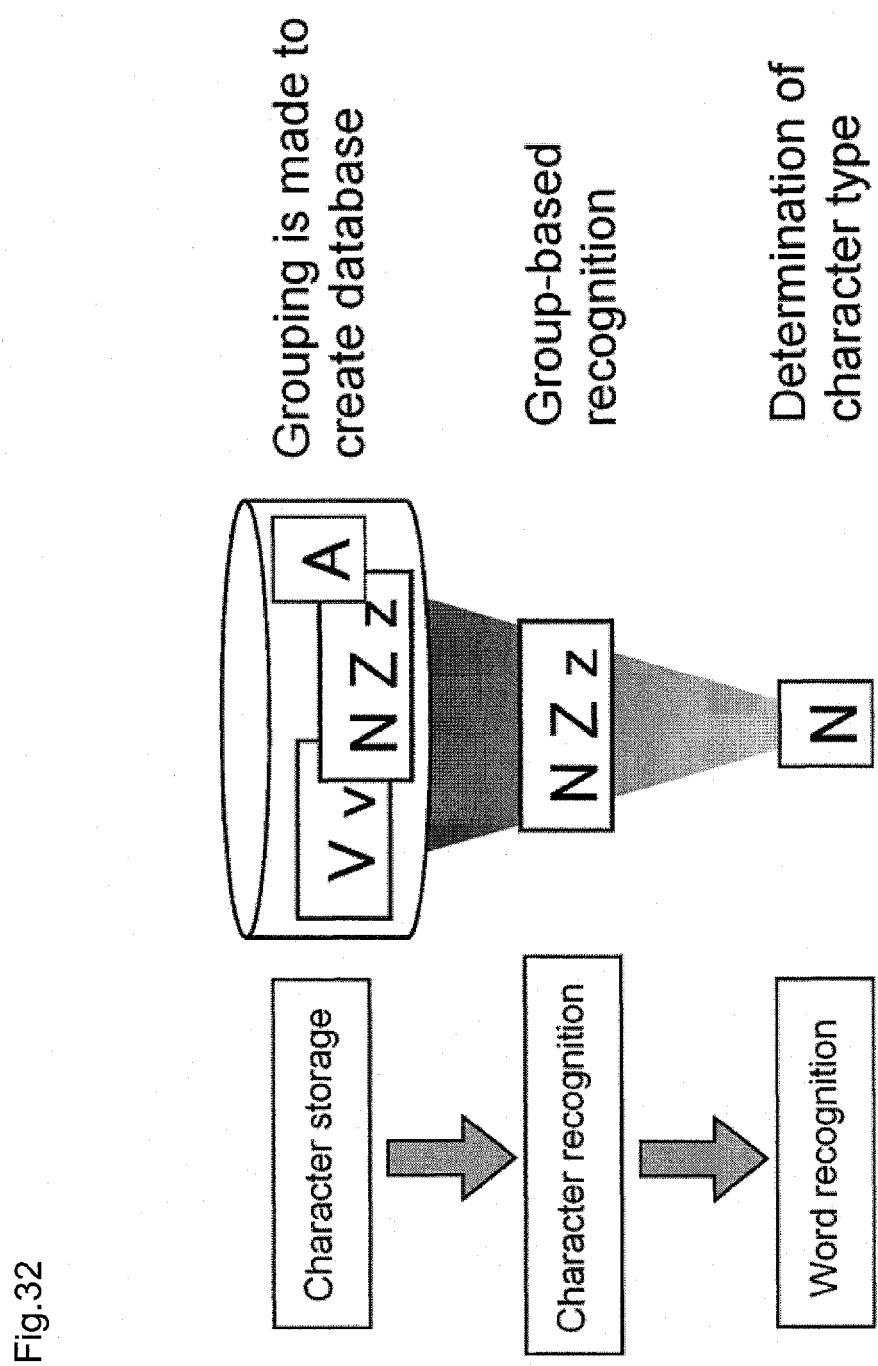
FIG. 32 is an explanatory view illustrating a flow to the determination of character in the demonstration system used in the experimental example 4 according to the present invention.

The camera-based character recognition employed in the demonstration system uses the method described in Section 2.3 as a basis, and also uses the modification described in Section 8. In the recognition for each connected component, the characters having the affine transformation relation, such as "N", "Z", and "z", cannot be discriminated, so that the group of these characters is regarded as being assigned in the same group as illustrated in FIG. 32, and during the recognition, plural characters belonging to the group are outputted as a candidate. The recognition on a group basis is only made in the character-based recognition, but a recognition in a level of one character is performed in the word recognition described in the next section. However, the combination of the characters having the affine transformation relation varies depending upon fonts, so that the manual grouping becomes difficult, as the type of fonts to be registered increases. Therefore, in this method, an automatic grouping is performed during the storage of characters. When a character image is newly stored in the database, the character image is compared with the character images that have already been present in the database. When a similar character image is found, the newly stored character is assigned to the group of the similar character.

The connected components can be discriminated on a group basis through the recognition using the database created as described above. In this case, the paper of the text and the pose of the character can be acquired as the affine transformation parameters. The affine transformation parameters are estimated as being classified into independent scaling, shear, rotation, and scaling. When it is supposed that all characters are written on a plane paper, parameters of shear and independent scaling must be equal in all connected characters in the paper. By utilizing this, the distortion on the paper can be removed. The rotation parameters can be acquired for each character, and they are utilized for the word recognition process. The scaling parameters are acquired for each character, but they are not used for the word recognition in this demonstration system. A character including plural connected components, such as "i" or "j" is stored such that the groups and positional relationship of the connected components are recorded, and the connected components are combined, after the group is identified during the recognition, to be restored as one character.

The group and the pose of each character can be found according to the process described above. However, in the demonstration system, the process of estimating a character having a plausible pose and determining a final resultant one character from the group containing plural characters is executed in the next word recognition described in the next section.

9.2 Word Recognition 9.2.1 Problem

Figure 33:
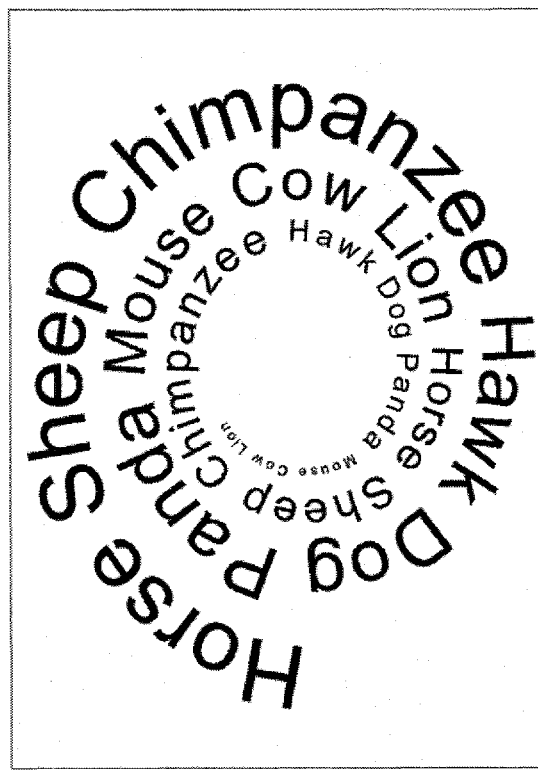
FIG. 33 is an explanatory view illustrating one example of a text that has no text lines but can be recognized in the experimental example 4 according to the present invention.

In the demonstration system, a word recognition is carried out to cope with a word that is identified from the other words with a space formed between the words, such as English, and that is according to a rule of a predetermined reading direction, e.g., a rule that the words are written from left to right. The prerequisites are such that an independent scaling and shear distortion are removed from a text image during the character recognition. We propose a method of connecting characters in a text to acquire a plausible word by utilizing a direction of the character. The "direction of a character" indicates a rotation parameter obtained during the character recognition in Section 9.1. The method in the Non-Patent Document 4 for estimating the arrangement of the characters by utilizing a text line can recognize only a text having a text line being parallel straight line, but the present invention can be applied to a text not having a text line, such as the texts illustrated in FIGS. 1, 21, and 33.

9.2.2 Word Recognition Method

Figure 34:
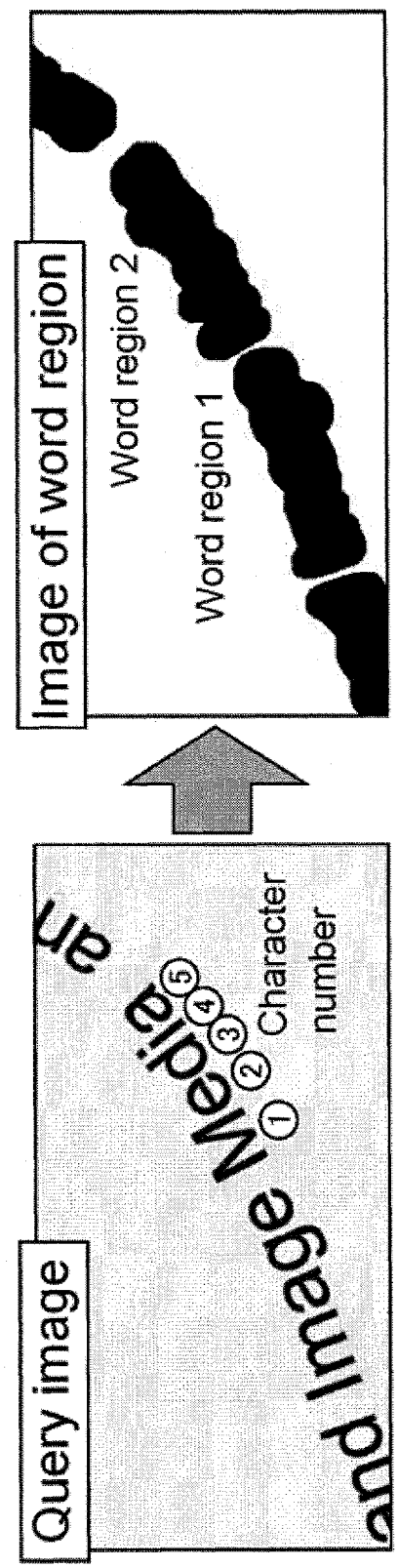
FIG. 34 is an explanatory view illustrating a method of acquiring a word region in the demonstration system used in the experimental example 4 according to the present invention.

Which is the region of one word in an image is firstly estimated. When a text illustrated in FIG. 34 is subject to a certain blurring to be binarized, the adjacent characters are combined, wherein only the portion separated with a space is separated. Therefore, the word region can be estimated by extracting the connected components in the blurred image. An appropriate degree of blurring is changed according to a space and thickness of a character in the captured image. In this demonstration system, the distance between the characters and an area of each character are calculated, and the degree of blurring in proportion to the calculated result is sequentially determined. The distance between characters is calculated in such a manner that a Euclidean distance between a certain character in the captured image and a character located closest to the character is obtained, and the obtained distances are averaged. The area means a number of pixels in the connected component, and the average number is used. The blurring is made with the use of a Gaussian filter in order that $\sigma$, that is the standard deviation of the Gaussian filter, satisfies the equation of $\sigma=200\times d/a$, when the average character-to-character distance is defined as d, and the average area is defined as a. An adaptive binarization of Open CV was used for the binarization process of the blurred image.

The coordinates of the original text image and the coordinates of the blurred image are compared so as to check which word region each character is contained, whereby characters constituting each word are determined. Referring to FIG. 34, the characters extracted from a word region 2 are characters with character numbers 1 to 5. The "characters" in this stage has just been subject to the discrimination on the group basis in the previous character recognition process, so that each character still has plural character candidates. In this description, the group of the character number 1 contains two characters which are "M" and "W", while the group of the character number 3 contains two characters which are "d" and "p". Each of the other groups contains only one character.

Next, the arrangement and character type of the character are estimated for each word. A character string in a scene includes various layouts, which are designed to be read by people and to guide people. It can be supposed that the arrangement or direction of characters is not rapidly changed. In the demonstration system, the arrangement and character type of characters in a word are estimated based upon the supposition.

The estimation of the order of the arrangement of characters in a word will be described. The case where the word in the word region 2 in FIG. 34 is read in the order of the character numbers "4, 5, 1, 2, 3", that is, the distant character is abruptly read, is not applied to the supposition. In the demonstration system, as a method of acquiring the plausible arrangement, the shortest route of the characters contained in the word is selected, wherein each character is traced once, that is, the shortest path problem is solved by Dijkstra's Algorithm. The route is formed by linking each character on the text image with a straight line, and a cost means the Euclidean distance between characters. As a result, the order of "1, 2, 3, 4, 5" or the reverse order of "5, 4, 3, 2, 1" is obtained as the shortest route.

Figure 35:
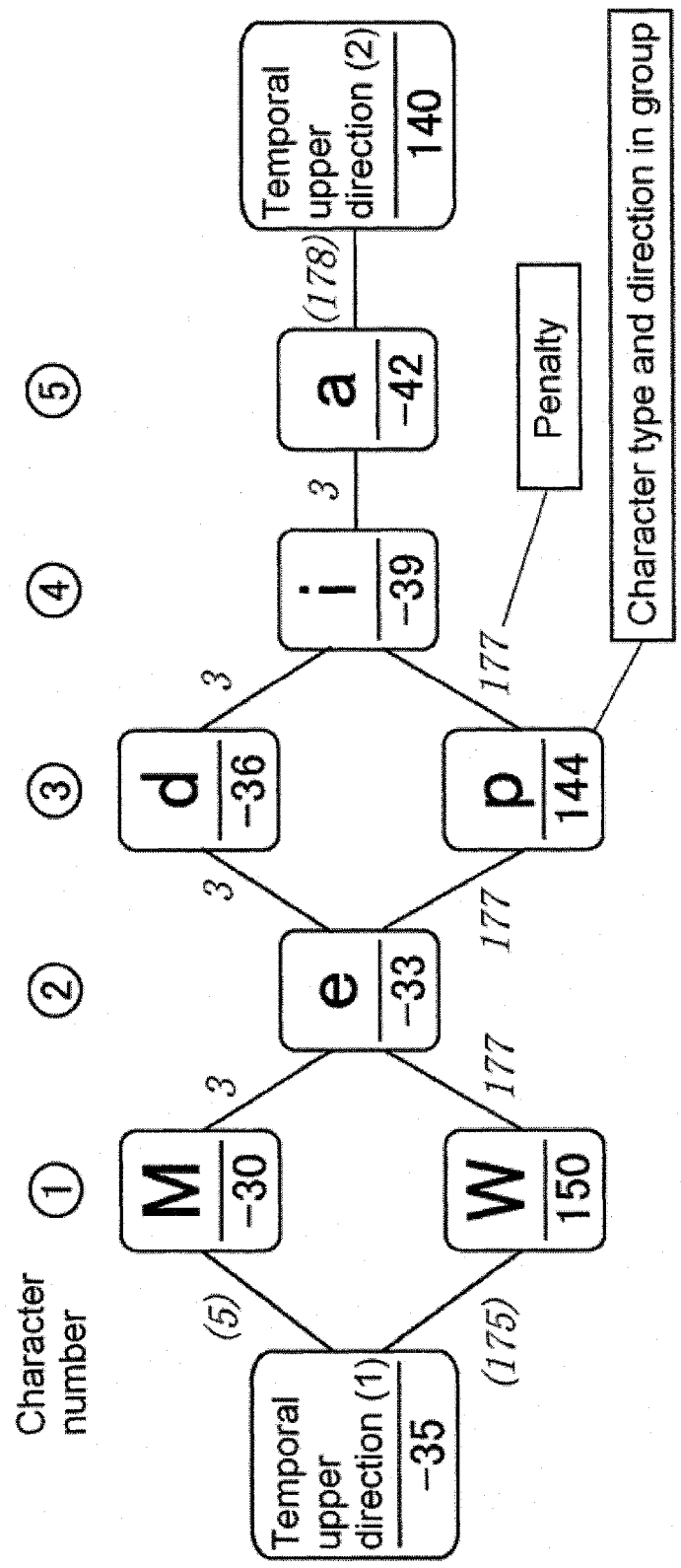
FIG. 35 is a graph illustrating candidates of respective characters in the word region 2 in FIG. 34 in the estimated arrangement order in the demonstration system used in the experimental example 4 according to the present invention.

Next, the character types of each character are combined in the determined order to show candidates of the word. FIG. 35 is a graph illustrating the candidates of each character in the word region 2 in the estimated arrangement order. The numerical values and "temporal upper direction" will be described later. When the character types are combined in the order from the character number 1, or in the reverse order from the character number 5, according to the graph, the words of "Media", "Wepia", and "aideM" and the like are considered. If we intend to read the word in the word region 2 as "Wepia", "W" and "p" make a half turn compared to the other characters, and this cannot be considered as an appropriate arrangement, considering the above-mentioned supposition. Although the directions of the characters are the same, the "aideM" has to be read from right to left, so that this is not appropriate. In the demonstration system, two penalties (negative evaluation indexes) involved with the direction of the character are formed to obtain plausible word candidates. The rotation angle of the character obtained in the character recognition is utilized for the calculation of the penalty. The rotation angle is set such that the rotation to the right is defined as a positive rotation with the upper direction in the captured screen being defined as 0 degree. The numerical values illustrated below the respective characters in FIG. 35 indicate the direction.

The first penalty is added during the trace of the node of the character, based upon the supposition that "the direction of the character is not rapidly changed". As the difference in the rotation angle between a character and one before the character is small, it can be said that the directions of the characters are the same. Therefore, the angular difference is defined as the penalty. The domain of the angular difference is 0° to 180°. For example, when "e" is traced, and then, "d" is traced, the directions of two characters is 3° in FIG. 35, so that 3 is added as the penalty. There appear several combinations to which the large penalty is added in the route. In this case, the calculation is quitted, and the combination is excluded from the candidates, which reduces the processing time.

Figure 36:
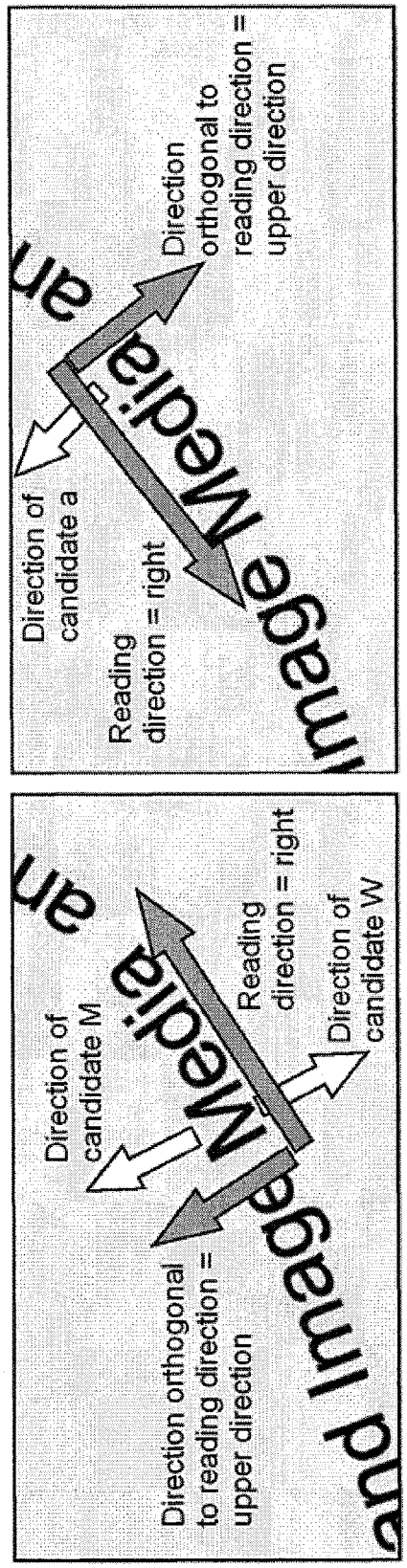
FIG. 36 is an explanatory view for describing a temporal procedure in an upper direction involved with a rule that "a word is read from left to right" in the demonstration system used in the experimental example 4 according to the present invention.

The second penalty is involved with the rule that "a word is read from left to right". The concept will be described with reference to FIG. 36, taking the word in the word region 2 as an example. When it is supposed that we read the word from the character number 1 such as "Media", the direction from the first character to the second character can be supposed to be the right direction as illustrated in FIG. 36(*a*). Therefore, the upper direction can be supposed to be the direction orthogonal to this direction. As the difference between the upper direction and the angle of the candidate for the first character is small, the candidate can be said to be the plausible character. Therefore, the difference value is defined as the penalty. In FIG. 35, the penalty between the "supposed upper direction (1)" and the next node is calculated, and when the upper direction is −35°, the penalty is 5 for the case where the character number 1 is "M", and 175 for the case where the character number 1 is "W". When it is supposed that the word is read from the character number 5 like "aideM", the upper direction is supposed as in FIG. 36(*b*), so that the "supposed upper direction (2)" in FIG. 35 is determined.

As described above, after the total of the penalties is obtained for each combination of the character candidates, they are sorted in ascending order, whereby the plausible word in the text can be estimated.

In the case of the word region 2 used as the example, "Media" has the minimum penalty of 17. The character types in the same group such as "d" and "p", which cannot be discriminated by the character-based recognition, can be discriminated in a character level in the word recognition. However, the character types having a scaling relation and having a similar direction, such as "O" and "0", have substantially equal penalties, resulting in that the determination of the plausible character type is difficult. For this, all of plural candidates having small penalty are used as a keyword for information search, and if there is the candidate to which a link is established, this candidate is regarded as the plausible word, whereby the character type is determined, and the access to the link destination is made. We also make a study on a function in which an access can be made, with a fuzzy search, to a word that contains an erroneously-recognized character in the future.

The function of presenting information by fonts was presented in Section 9.1. In the demonstration system, a font of a word is estimated by a simple method. When a character is searched with the penalty being calculated, each node holds font information in addition to the character type and the rotation angle, and vote is cast to the histogram of the font every one trace of a character. After we trace up to the last character, and one candidate of a word is generated, the font most frequently appears is estimated as the font of the word. In the future, a penalty involved with the font is created, and the font is estimated through the check whether or not the font of the character is equal to the font of the adjacent character, in order to enhance precision in the font discrimination.

9.3 EXPERIMENTAL EXAMPLE 4

In order to confirm the effectiveness of the present embodiment, an experiment for recognizing a word in a text captured by a camera was carried out. In the experiment below, a computer having a CPU of Opteron 2.8 GHz and a memory of 16 GB was used. In the experiment, it was checked how to change the recognition precision and processing time, when the types of the fonts stored in the database increased.

10 fonts illustrated in FIG. 25 were selected, and databases each having each of 1 to 10 types of fonts stored therein were prepared for recognition. When the number of fonts was one, only Arial font was used, and when the number of fonts was two, Arial and Century were selected in descending order and used for the creation of the database and recognition. 62 characters including capital alphabets, lowercase alphabets, and figures were stored for each font.

In order to cope with degradation caused by defocus and low resolution, the above-mentioned generative learning method was used. In the experiment, three levels of Gaussian blurring were applied, and three levels of deterioration in resolution (including a level of no blurring, and a level of unchanged resolution) were applied, i.e., nine levels in total were applied, as degradation. Therefore, data corresponding to character images of 5580 sheets is stored for 10 fonts.

Figure 37:
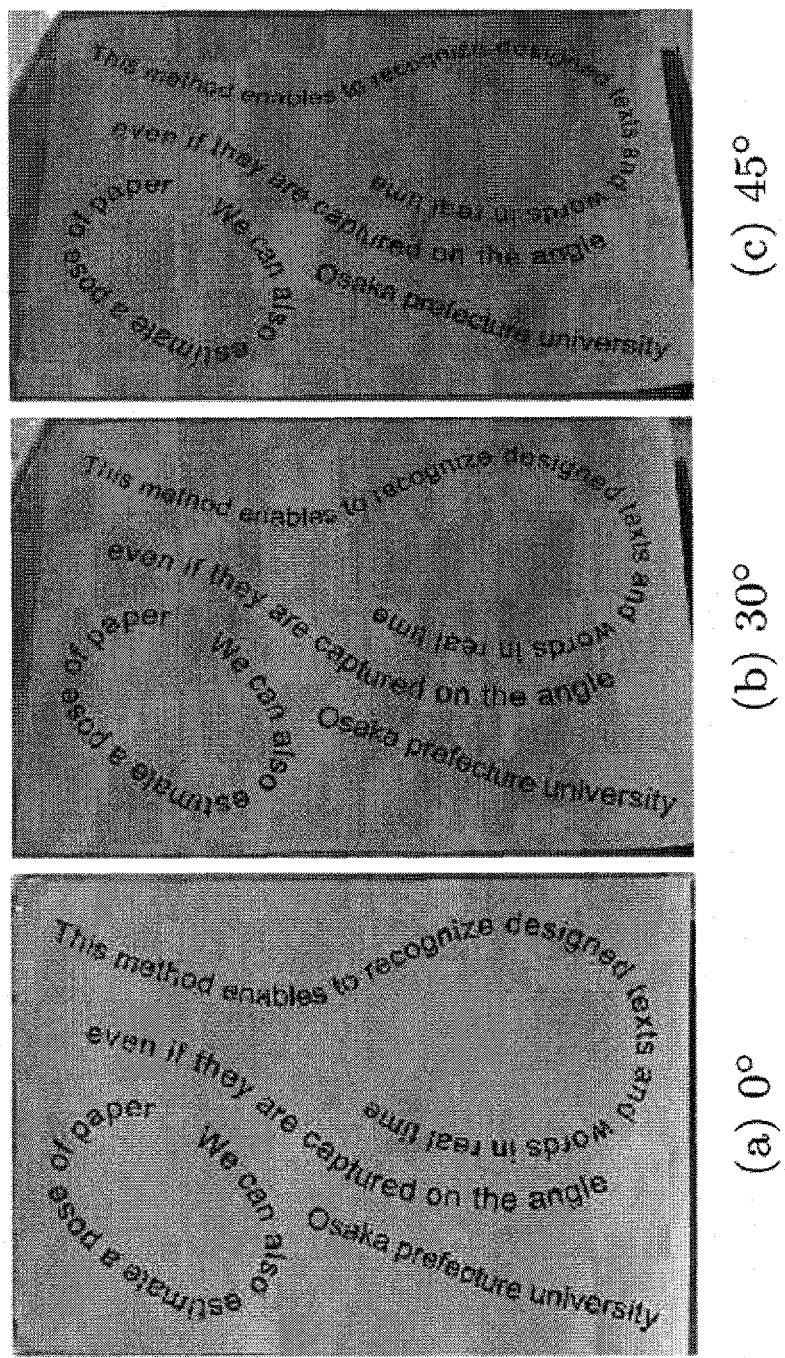
FIG. 37 is an explanatory view illustrating a text used as a recognition target in the experimental example 4 according to the present invention.

The recognition target was the text illustrated in FIG. 37, wherein the target included English sentences of 144 characters and 30 words on a curved line. An article "a" contained in the text does not have to be subject to the word recognition process, so that this is not contained in the number of words. This text was printed on 10 A4 papers with the font same as that in the database. The paper was captured by a camera with 0, 30, and 45 degrees from front. FIGS. 37(a) to 37(c) illustrate the captured image with Arial. When the text of Arial was captured with 0 degree, the image size was 1633×2333 pixels, and the average size per one character was 58.2×48.0 pixels.

Each character was subject to the group-based recognition, and then, the candidates of the word is shown, and the penalties descried in Section 4.2 were arranged in ascending order. It was checked for each word whether only one word having the minimum penalty was the candidate or not, or whether a correct word was contained in the top 10 candidate words or not, in order to obtain a word recognition rate. As described above, it is difficult to discriminate character types whose capital alphabet and lowercase alphabet are in scaling relation in the present embodiment. Therefore, characters of "C", "O", "S", "V", "W", "X", and "Z" are determined to be correct, regardless of a capital letter or lowercase letter. The estimation of fonts was not the subject of the performance evaluation, and only the comparison of character types was the subject. When fonts were compared in a preliminary experiment, the word recognition rate for texts of 10 fonts captured with 0 degree was 60.0%, considering only the minimum penalty, and 72.0% considering the top 10 words.

Figure 38:
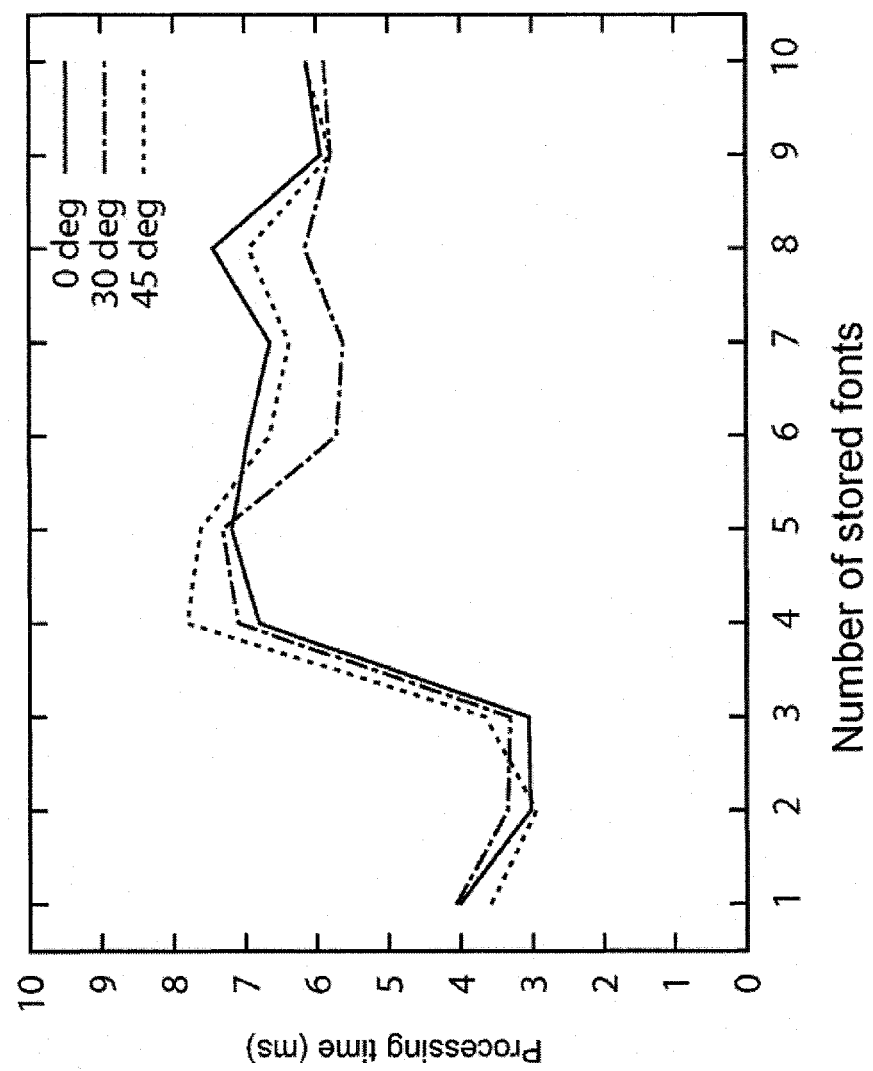
FIG. 38 is a graph illustrating a processing time per one word in the experimental example 4 according to the present invention.

FIG. 38 illustrates a processing time per one word. The processing time is a time needed for the word recognition, and the time needed for the character recognition is not included in the processing time. It was found that the processing time greatly varied depending upon the number of fonts stored in the database, and the processing time varied depending upon the type of fonts. The processing time was 6.14 milliseconds in the case of 10 fonts and 0 degree. The reason why the processing time was increased is that the number of character types per 1 group was increased due to the increased stored images, so that the computational cost for penalty increased. The character group of the same group upon the storage of Arial is as illustrated in Table 7 in Section 8.2

Figure 39:
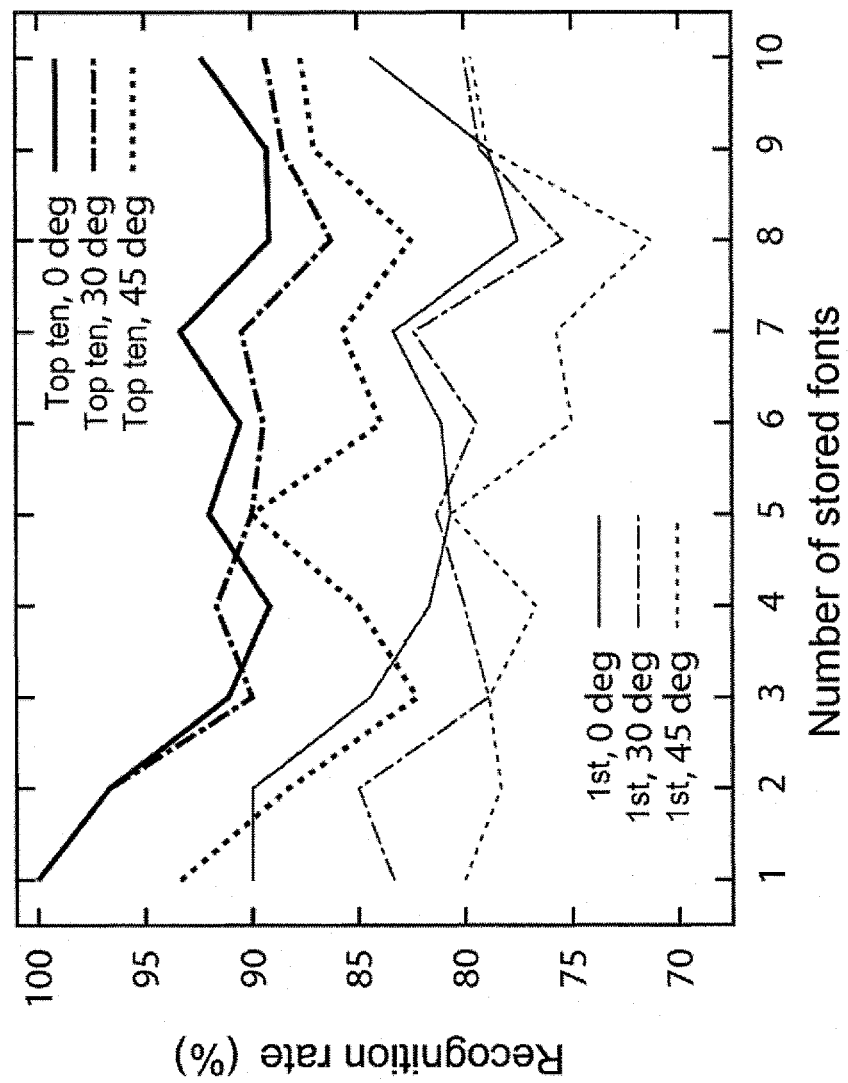
FIG. 39 is a graph illustrating a result of a word recognition in the experimental example 4 according to the present invention.
Figure 40:
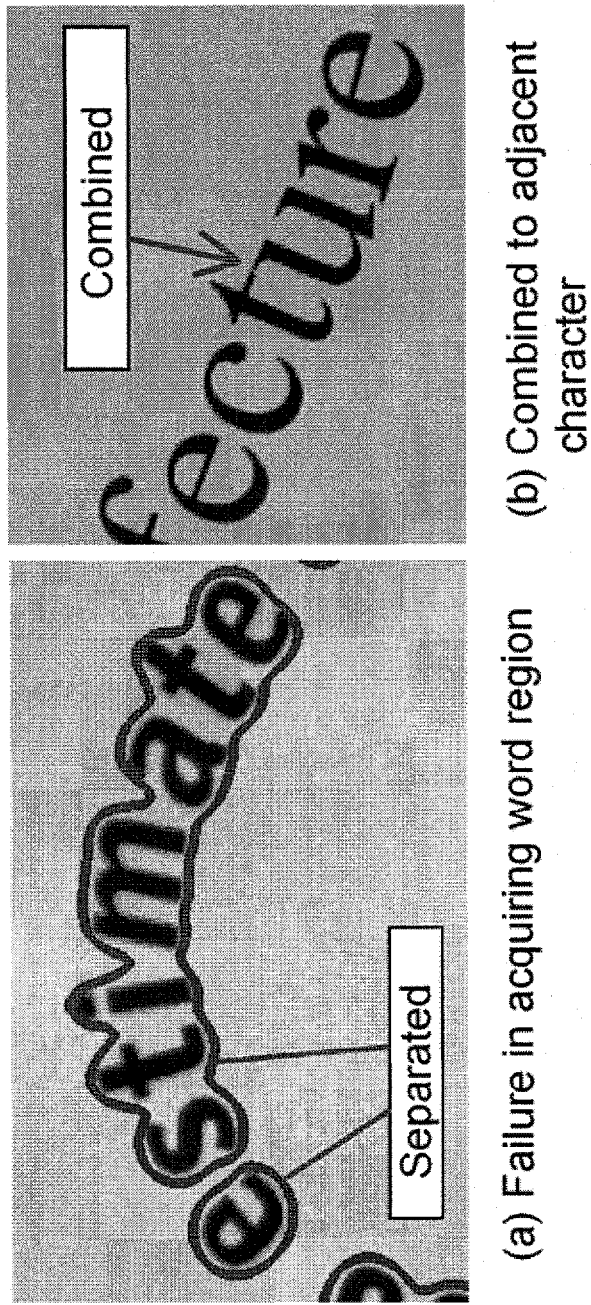
FIG. 40 is an explanatory view illustrating failure examples of a word recognition and character recognition in the experimental example 4 according to the present invention.

FIG. 39 illustrates the result of the word recognition. The graph illustrates the recognition rates when the word at the first place is considered in the ascending order of the penalty, and the recognition rates when top ten words are considered, in respective capture angles. The recognition rates decreased with the increase in the number of fonts to be handled, wherein the recognition rate increased by an average of 9.7% through the check of top ten words, compared to the case where only the word at the first place is checked. The recognition rate of 92.3% was achieved with 10 fonts and 0 degree. The reason why the correct word cannot be covered only by the check of the word at the first place is that incorrect characters having similar directions in the same group get smaller penalty. When the top 20 words are checked, the recognition rate increases by an average of 0.4% compared to the check of the top 10 words, which means the erroneous recognition through the check of top 20 or more words is a recognition failure due to the factors other than the inversion of penalty. The failure examples of the word recognition include the case where a user fails to refine groups on a character basis, and the case where a user fails to acquire a word region. FIG. 40(a) illustrates an example of a failure in acquiring a word region. A frame border enclosing a character string indicates a contour of an estimated word region, wherein "e" and other characters of "estimate" are separated from each other. It was confirmed that, if blurring of an image was more strongly made in order to recognize this word, plural words might be combined over a space in another text image. Therefore, the future subject is to change a method of determining a strength of blurring, or to acquire a word region by a method other than the method of blurring an image.

Figure 41:
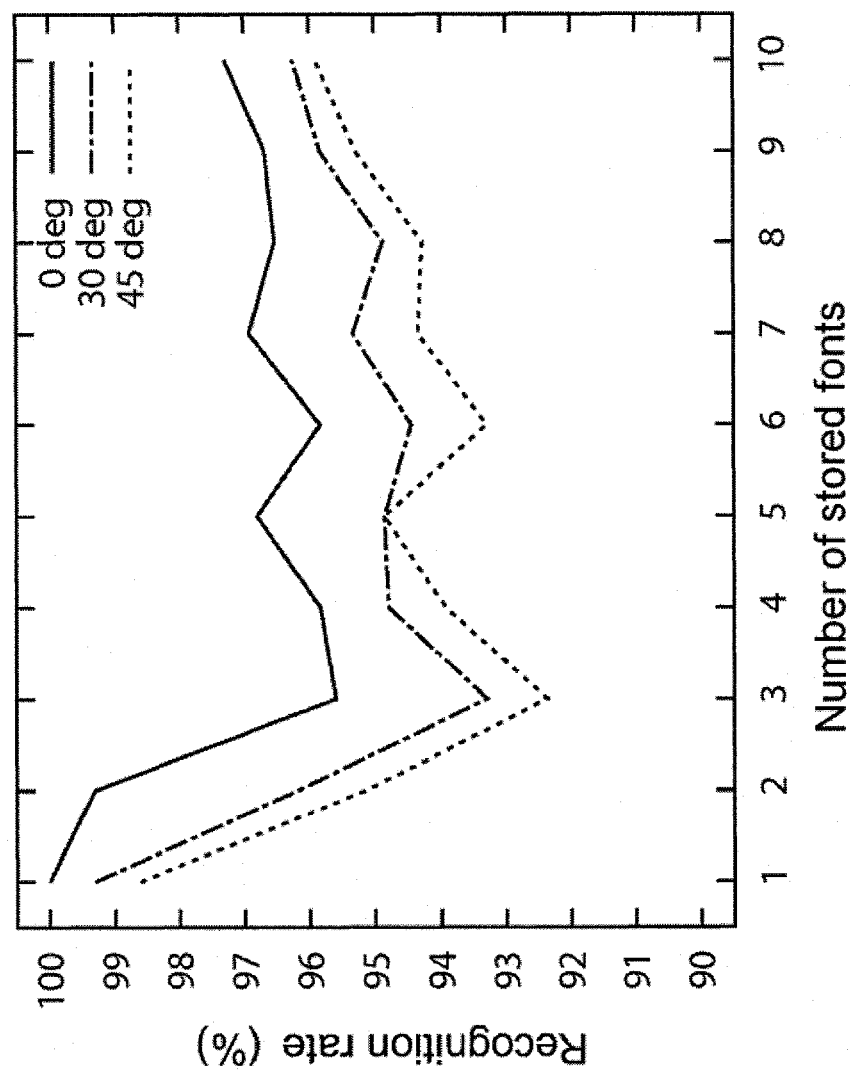
FIG. 41 is a graph illustrating a recognition rate in a character-based recognition in the experimental example 4 according to the present invention.

FIG. 41 illustrates recognition rates on a character basis for verification. The group-based recognition was performed, and the case where correct character types were included in the acquired group was regarded as a successful recognition. The failure examples of the character recognition include the erroneous recognition due to the increased number of data in the database, and the case where adjacent character and connected component are combined such as "t" and "u" in FIG. 40(b) to make it impossible to perform the character-based recognition. If the character-based recognition was failed once, the recognition of one word is impossible, even if the recognition of other characters is successful. Therefore, the precision in the character-based recognition is extremely involved with the precision in the word-based recognition. The improvement in the character recognition technique, the correction of the error in the character recognition using a word dictionary, and the estimation of a correct word are important to enhance the word recognition rate.

Figure 42:
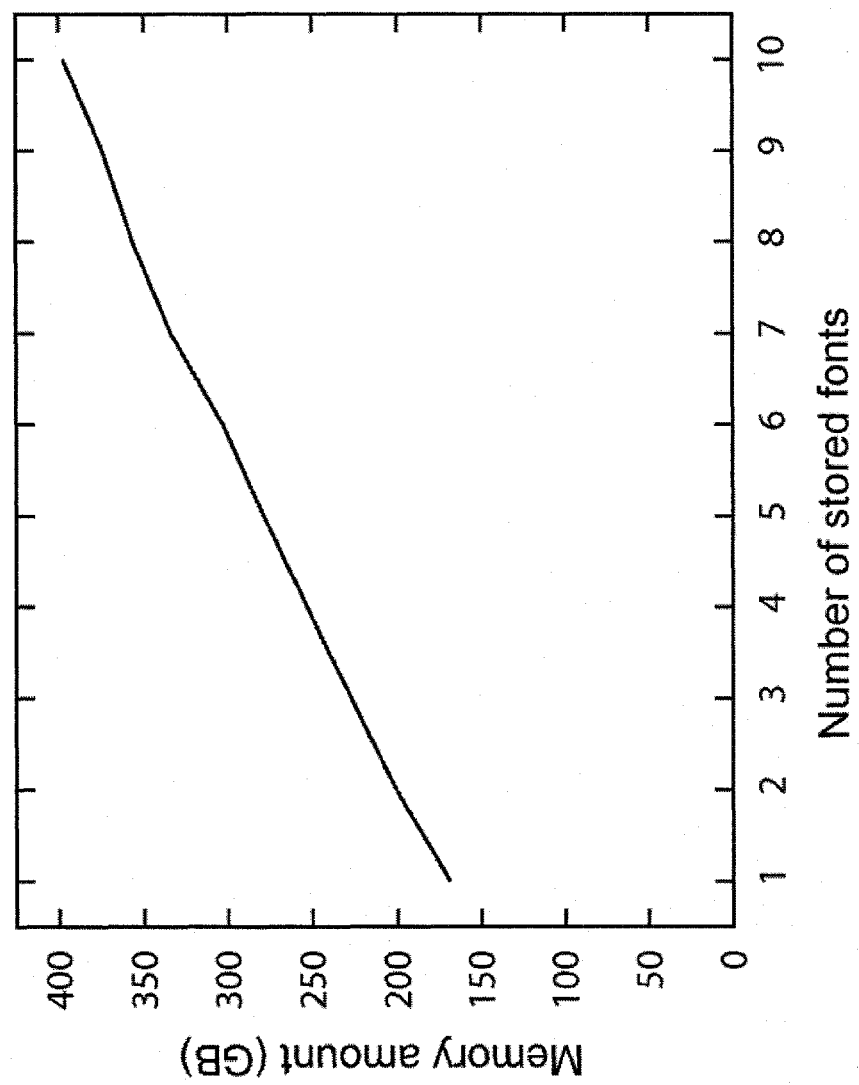
FIG. 42 is a graph illustrating a memory amount in the experimental example 4 according to the present invention, when a database is read.

Finally, the other performances involved with convenience of application will be described. The time required for the word recognition process is as illustrated in FIG. 38. The time required for the character recognition process was 3.44 milliseconds per one character in the case of 10 fonts and 0 degree. When a text of one word with five characters is to be recognized, the time is 23.34 milliseconds including five character recognitions and word recognition, which means about 42 words can be processed in one second. Thus, a real-time operated interface can be mounted to a commercially available notebook personal computer and a camera. FIG. 42 illustrates a memory amount when the database is read. The memory amount needed to process alpha-numerals of 10 fonts was about 397 MB.

Industrial Applicability

As described above, a simple but efficient method for recognizing a pattern such as characters or pictograms in real time is provided. Specifically, the present invention provides a pattern recognition method that can simultaneously solve three requirements: (1) ready for real-time processing, (2) robust to perspective distortion, (3) free from layout constraints. Although specific numerical values are not illustrated in the present specification, the pattern recognition apparatus based upon the pattern recognition method can be realized on a notebook personal computer connected to a web camera, and can be operated in real-time.

In Section 8 in the embodiment, a high-speed and robust nearest neighbor search method is employed. Thus, about 140 characters can be recognized in one second under the condition in which 100 fonts (the total number of stored images is 55800) are stored in the database, and degradation (projective distortion, deterioration in resolution, blurring) is caused on a character image serving as a recognition target.

A demonstration system for using a character string in an environment as a link anchor is created and operated. In the demonstration system, a word recognition method considering convenience is proposed, and its effectiveness is shown by experiments.

Explanation Of Numerals
11 Image storing section
13 Image recognition section
15 Database

What is claimed is:

1. A pattern recognition apparatus comprising:
an extracting section for extracting, from a query image that is composed of at least one piece of pattern component and previously undergoes a geometric transformation, the pattern component;
a feature acquiring section for acquiring a geometric invariant feature of the pattern component as a query feature, the query feature being represented by at least three feature points including first, second and third feature points, each feature point located on the pattern component and being retrieved from the pattern component based on a predetermined rule;
a comparing section for comparing the query feature with a plurality of reference features, each reference feature representing different reference patterns prepared as candidates for pattern recognition; and
a pattern determination section for determining, as a recognition result, a specific reference pattern out of the candidates based on a similarity of features therebetween and, wherein:
each reference feature is represented using feature points retrieved from each reference pattern based on the same rule as that of the query feature, and
based on the predetermined rule, a position of the first feature point is specified out of points which are located on the pattern component and are invariant to the geometric transformation, a position of the second feature point is specified using a characteristic regarding a shape of the pattern component, the characteristic being invariant to the geometric transformation, and a position of the third feature point is specified from a predetermined value being invariant to the geometric transformation and from the specified positions of the first and second feature points.

2. A pattern recognition apparatus according to claim 1, wherein:
the position of the first feature point is specified out of pixels on a contour of the pattern components.

3. A pattern recognition apparatus according to claim 1, wherein:
the characteristic is characterized in that a center of gravity is invariant to affine transformation as a kind of the geometric transformation, and
the position of the second feature point is specified as a center of gravity of the pattern components, using the characteristic.

4. A pattern recognition apparatus according to claim 1, wherein:
the characteristic is characterized in that an area ratio is invariant to affine transformation as a kind of the geometric transformation, and
the position of the third feature point is specified from a contour of the pattern component and based on a predetermined value of an area ratio of the area of the pattern components to the area of a triangle defined by apexes corresponding to the first, second and third feature points, using the characteristic.

5. A pattern recognition apparatus according to claim 1, wherein:
the feature acquiring section acquires the geometric invariant feature using a geometric invariant coordinate system that is spanned by two linearly independent vectors, each vector connecting two of the acquired three feature points.

6. A pattern recognition apparatus according to claim 1, wherein:
the comparing section makes comparisons of the query feature with the reference features that are related to the corresponding reference patterns and stored in a hash table, wherein:
the hash table has a plurality of bins;
each reference feature is preliminarily classified and stored in one of the bins determined through a calculation of a predetermined hash function from the reference feature; and
the comparing section refers an appropriate bin for each comparison using an index that is obtained through a calculation of the hash function from the acquired query feature.

7. A pattern recognition apparatus according to claim 6, wherein:
each reference feature is stored in the bin with related to coordinate data of the acquired three feature points and to an identifier of the reference pattern corresponding to the reference feature; and
the pattern determination section estimates a pose of the query image based on matching of each coordinate data related to the query feature to that related to each reference feature stored in the referred bin and based on a majority rule on the matching.

8. A pattern recognition apparatus according to claim 1, wherein:
the pattern determination section has a discrete pattern table storing at least one group of discrete patterns, each discrete pattern corresponding to one of the reference patterns and the group of discrete patterns providing one recognition result;
refers the discrete pattern table to decide whether a correspondence between the determined specific reference pattern out of the candidates and one of the discrete patterns of the group exists or not; and determines a recognition result as that being provided by the group of which the corresponding discrete pattern to the determined specific reference pattern belongs to the group when the correspondence exists and a correspondence of every other discrete pattern of the group is previously exists.

9. A pattern recognition apparatus according to claim 8, wherein:
the discrete pattern table stores a relative position of one discrete pattern to another discrete pattern in the group, and
the pattern determination section determines a recognition result when another determined specific reference pattern locates at a position specified by the stored relative position of the discrete pattern corresponding to one determined specific reference pattern.

10. A pattern recognition apparatus according to claim 1, wherein
the query image includes a word pattern composed of plural characters, and
the pattern recognition apparatus further includes:
a word candidate determining section for obtaining the shortest route in which each character recognized by the pattern determining section is traced once, and for determining an order and inverse order of the obtained route as candidates of the word;

a rotation angle determining section for obtaining a rotation angle of each character in a predetermined direction of the query image; and a reading-order determining section in which a difference in the rotation angle between two characters adjacent to each other along the order or inverse order of the route is specified as a first evaluation index, the rotation angle that the first character should take is estimated based upon the direction toward a second character, which is adjacent to a first character that is defined to be either one end of each candidate, and a predetermined rule involved with a reading direction, and the difference between the estimated rotation angle and the rotation angle of the first character determined by the rotation angle determining section is specified as a second evaluation index, wherein the candidate that minimizes the first and second evaluation indexes is selected in order to determine a reading order of characters constituting the word.

* * * * *